US009227687B2

(12) United States Patent
Delgatty et al.

(10) Patent No.: US 9,227,687 B2
(45) Date of Patent: Jan. 5, 2016

(54) FOLDABLE ELECTRIC VEHICLE

(71) Applicant: Egological Mobility Solutions Inc., Agoura Hills, CA (US)

(72) Inventors: Grant Delgatty, Aguora Hills, CA (US); Sven Etzelsberger, Aguora Hills, CA (US)

(73) Assignee: URBAN626, LLC, Pasadena, CA (US)

( * ) Notice: Subject to any disclaimer, the term of this patent is extended or adjusted under 35 U.S.C. 154(b) by 0 days.

(21) Appl. No.: 14/483,064

(22) Filed: Sep. 10, 2014

(65) Prior Publication Data

US 2015/0068828 A1 Mar. 12, 2015

Related U.S. Application Data

(60) Provisional application No. 61/876,124, filed on Sep. 10, 2013, provisional application No. 61/929,862, filed on Jan. 21, 2014.

(51) Int. Cl.
| | |
|---|---|
| *B62K 15/00* | (2006.01) |
| *B62K 5/027* | (2013.01) |
| *B62K 5/06* | (2006.01) |
| *B62K 19/06* | (2006.01) |

(52) U.S. Cl.
CPC .............. *B62K 15/008* (2013.01); *B62K 5/027* (2013.01); *B62K 5/06* (2013.01); *B62K 19/06* (2013.01)

(58) Field of Classification Search
CPC .... B62K 15/006; B62K 15/008; B62K 15/00; B62K 3/00; B62K 5/00; B62K 11/00; B62K 17/00
USPC ............ 180/208, 210; 280/38, 638, 639, 641, 280/287, 278
See application file for complete search history.

(56) References Cited

U.S. PATENT DOCUMENTS

| 4,598,923 | A | * | 7/1986 | Csizmadia | .................... | 280/287 |
|---|---|---|---|---|---|---|
| D726,592 | S | * | 4/2015 | Zhang | ........................... | D12/107 |
| 2003/0051934 | A1 | * | 3/2003 | Ou | ................................... | 180/220 |
| 2004/0026147 | A1 | * | 2/2004 | Kao et al. | ....................... | 180/219 |
| 2008/0061528 | A1 | * | 3/2008 | Musabi | ......................... | 280/287 |
| 2008/0217085 | A1 | * | 9/2008 | Wernli | ........................... | 180/210 |
| 2009/0240858 | A1 | * | 9/2009 | Takebayashi | ................. | 710/110 |
| 2009/0289434 | A1 | * | 11/2009 | Lin | ................................. | 280/278 |
| 2011/0193313 | A1 | * | 8/2011 | Yun | ................................. | 280/278 |
| 2012/0043148 | A1 | * | 2/2012 | Brady et al. | ................ | 180/206.5 |
| 2012/0273287 | A1 | * | 11/2012 | Song | ........................... | 180/65.31 |

FOREIGN PATENT DOCUMENTS

| DE | 19516763 | A1 | * | 11/1996 | ................ | B62K 5/02 |
|---|---|---|---|---|---|---|
| WO | WO 9801334 | A1 | * | 1/1998 | .............. | B62M 23/02 |
| WO | WO 2011098887 | A1 | * | 8/2011 | | |

* cited by examiner

*Primary Examiner* — Keith Frisby
(74) *Attorney, Agent, or Firm* — KPPB LLP

(57) ABSTRACT

Foldable electrical vehicles and related charging infrastructure are described. The foldable electrical vehicle generally includes three structural arms (front and rear wheel-bearing arms and a seat-bearing arm) that are pivotally interconnected along their lengths such that they may be pivoted between a closed position wherein the three arms are disposed roughly parallel to each other in a compact folded configuration, and an open riding configuration wherein an angular relation is formed between the arms.

22 Claims, 27 Drawing Sheets

FIG. 2c
FIG. 2d
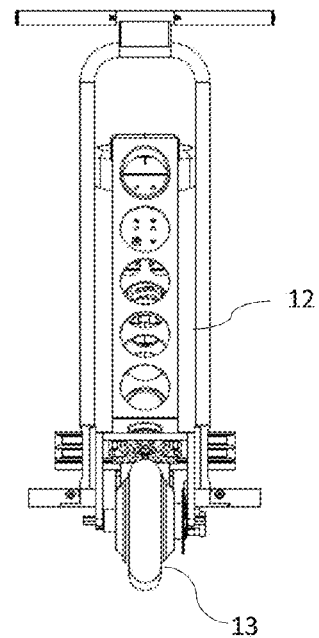
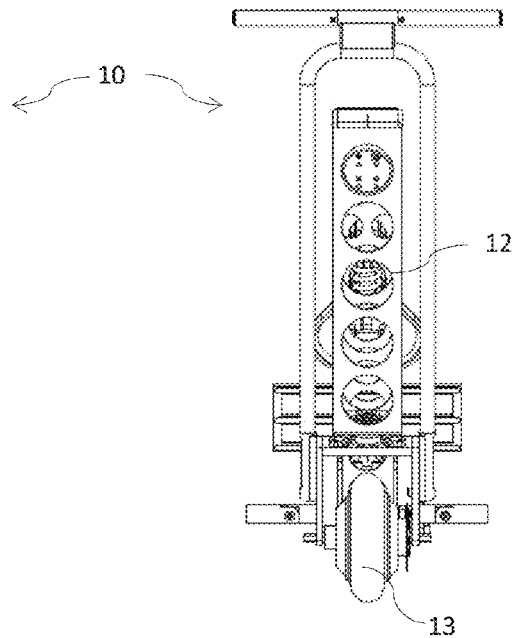
FIG. 2e
FIG. 2f
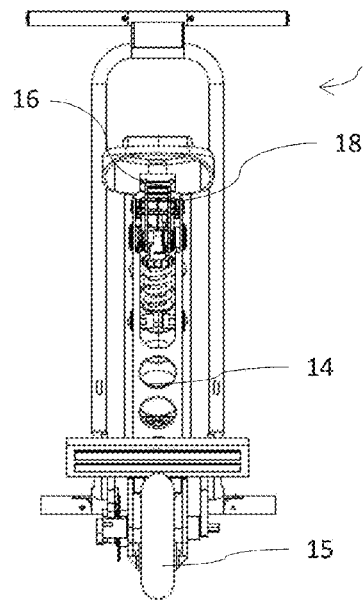
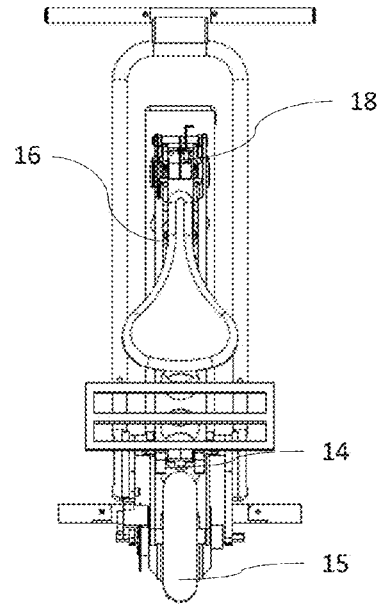

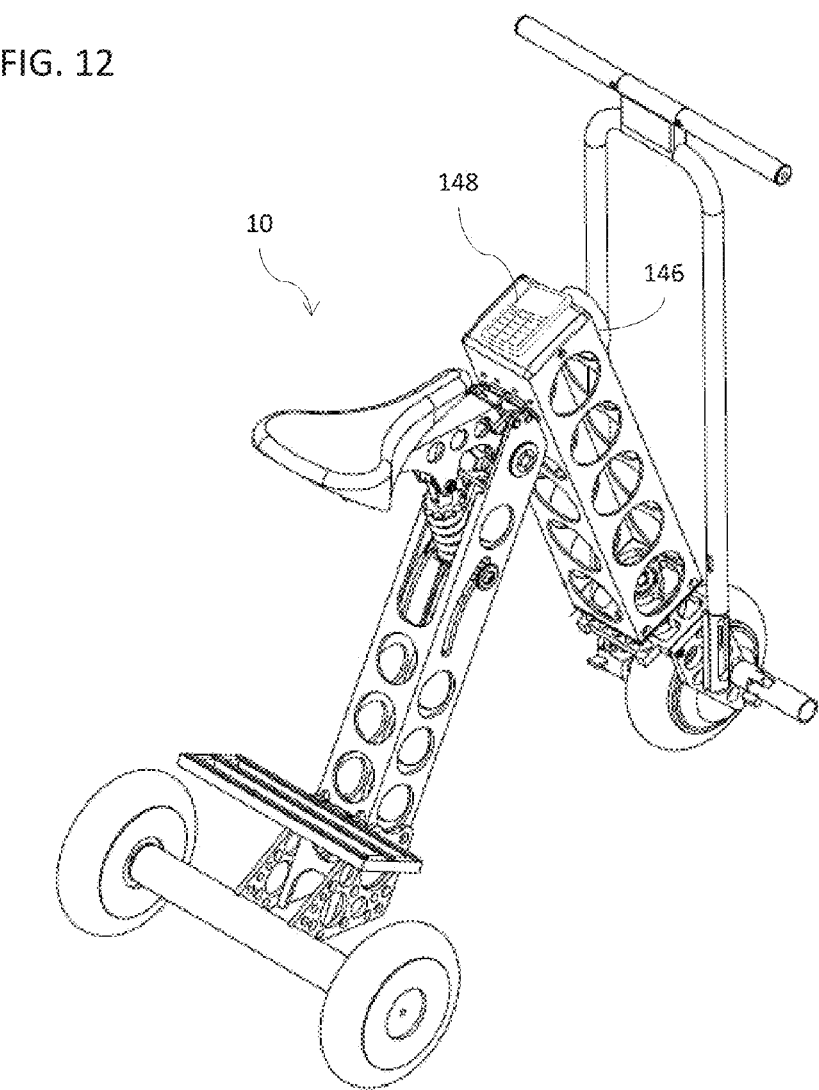

FOLDABLE ELECTRIC VEHICLE

This application claims priority to U.S. Provisional Application No. 61/876,124, filed Sep. 10, 2013 and U.S. Provisional Application No. 61/929,862, filed Jan. 21, 2014, the disclosures of each of which are incorporated herein by reference.

FIELD OF THE INVENTION

Compact, foldable electric vehicles and charging stations for said vehicles are described.

BACKGROUND OF THE INVENTION

A common difficulty encountered in public transport is in trying to move people from a transportation hub, like a railway station, bus stop, etc. to their desired destination, or from their origination point to a transport hub. These problems are referred to as the 'last mile' or 'first mile' problem, respectively. Where the population of a place is not dense, like in areas where there are extensive suburbs and exurbs, this difficulty can become chronic making public transport impractical. A number of solutions have been proposed to overcome this problem, including community transportation such as feeder transport and ride or car sharing programs, however, these methods require a social infrastructure that is often either not available or not extensive enough to meet commuter needs. Other solutions involve various forms of portable transport, such as bicycles. Most of these personal forms of transportation are relatively bulky and present challenges in storage at both ends of the commute, as well as transport within most public transport systems.

Accordingly, a need exists for personal transport devices and infrastructure capable of addressing the 'last mile'/'first mile' challenge.

BRIEF SUMMARY OF THE INVENTION

The application is directed to portable electric vehicles and infrastructure for portable electric vehicles.

Many embodiments are directed to a foldable vehicle including:
- at least two wheel-bearing arms having first and second ends and defining a wheel-bearing arm longitudinal axis, each of said wheel-bearing arms having at least one wheel assembly interconnected to the second end thereof and a wheel-bearing arm pivot hinge bracket disposed along the length thereof;
- at least one seat-bearing arm having first and second ends and defining a seat-bearing arm longitudinal axis, the seat-bearing arm having a seating platform interconnected to the second end thereof and a seat-bearing pivot hinge bracket disposed along the length thereof; and
- wherein the at least two wheel-bearing arm pivot hinge brackets and the seat-bearing pivot hinge bracket are configured to cooperatively interconnect to form a vehicle pivot hinge such that the arms are pivotably interconnected about a single vehicle pivot point to move between at least two configurations:
  - a first riding configuration wherein the longitudinal axes of the two wheel-bearing arms and the seat-bearing arms have angular offsets relative to each other, and
  - a second folded configuration wherein the longitudinal axes of the two wheel-bearing arms and the seat-bearing arm are roughly parallel.

In other embodiments, the foldable vehicle includes a steering mechanism interconnected with at least one of said wheel-bearing arms and configured to change the directional orientation of at least one wheel assembly relative to the vehicle. In some such embodiments the vehicle includes a front wheel-bearing arm and a rear wheel-bearing arm, and wherein the steering mechanism is pivotably interconnected with the wheel assembly of the front wheel-bearing arm to move between at least two configurations:
- a first riding configuration wherein the longitudinal axes of the front wheel-bearing arm and the steering mechanism have angular offsets relative to each other, and
- a second folded configuration wherein the longitudinal axes of the front wheel-bearing arm and the steering mechanism are roughly parallel.

In still other embodiments, the foldable vehicle includes a front wheel assembly lock configured to prevent changes to the directional orientation of the wheel assembly of the front wheel-bearing arm when in the folded configuration. In some such embodiments the front wheel-bearing arm defines an internal volume having an energy storage device disposed therein.

In yet other embodiments, the steering mechanism is at least one handlebar, and wherein the height and angle of the handlebar relative to the vehicle is adjustable.

In still yet other embodiments, the wheel-bearing pivot hinge brackets and the seat-bearing pivot hinge bracket are disposed proximal to the first end of their respective arms.

In still yet other embodiments, the foldable vehicle includes a pivot locking mechanism configured to disengageably lock the arms in one of the at least two configurations. In some such embodiments, the pivot locking mechanism includes a plurality of locking grooves and a cooperative locking pin configured to engage said locking grooves, said locking grooves being disposed on at least one of the at least two wheel-bearing arms, and said cooperative locking pin being disposed on at least another of the at least two wheel-bearing arms such that when the cooperative locking pin is engaged within the locking grooves the at least two wheel-bearing arms are prevented from pivoting relative to each other.

In still yet other embodiments, the foldable vehicle includes a locking mechanism disengagement element disposed on the seat-bearing arm and configured to disengage the pivot locking mechanism when the seat-bearing arm is pivoted upward relative to the axial alignment of the seat-bearing arm in one of either the first riding configuration or the second folded configuration.

In still yet other embodiments, the foldable vehicle includes a seat support element pivotably engaged at a first end thereof along the length of the seat-bearing arm and slidingly engaged at a second end thereof along the length of one of the at least two wheel-bearing arms such that a roughly triangular configuration is formed between the seat-bearing arm, the at least one wheel-bearing arm and the seat support element. In some such embodiments, the axis of the seat support element is roughly orthogonal with the axis of the seat-bearing arm. In some such embodiments, the seat support element slidingly engages a channel disposed along a portion of the wheel-bearing arm, the channel delineating a curvilinear path between at least two configurations:
- a first riding configuration wherein the longitudinal axes of the wheel-bearing arm and the seat-bearing arm and the seat support element have angular offsets relative to each other, and a second folded configuration wherein the longitudinal axes of the wheel-bearing arm and the seat-bearing arm and the seat support element are roughly parallel.

In still yet other embodiments, the seat support element comprises a resilient member. In some such embodiments the seat support element is configured such that when the seat-bearing arm is pivoted into the second folded configuration the resilient member is placed into tension such that a resilient locking force is applied to the seat-bearing arm to urge said seat-bearing arm into position in the second folded configuration.

In still yet other embodiments, at least one additional resilient element is disposed in relation to said seat support element to apply a force thereto, thereby urging said seat support element into at least one of either the first riding configuration or the second folded configuration.

In still yet other embodiments, the vehicle includes two wheel-bearing arms, a front wheel-bearing element having a front wheel assembly with a single wheel, and a rear wheel-bearing element having a rear wheel assembly with at least one wheel. In some such embodiments the rear wheel assembly comprises at least two wheels interconnected via a fixed axle. In still other such embodiments, the rear wheel assembly comprises at least two wheels interconnected via an axle pivotable about a point perpendicular to the axis of the rear wheel-bearing arm.

In still yet other embodiments, the foldable vehicle includes at least one luggage rack disposed on at least one of the wheel-bearing arms, said luggage rack being pivotable between at least two configurations:
- a first riding configuration wherein the longitudinal axes of the wheel-bearing arm and the luggage rack have angular offsets relative to each other, and
- a second folded configuration wherein the longitudinal axes of the wheel-bearing arm and the luggage rack are roughly parallel.

In still yet other embodiments, the foldable vehicle of claim 1, includes at least one electric motor disposed within at least one of the wheel assemblies and an energy storage device interconnected therewith.

In still yet other embodiments, the foldable vehicle includes an electronics interconnection disposed thereon, the electronics interconnection in signal communication with at least one sensor configured to deliver information on at least one vehicle parameter and deliver information from the at least one sensor to the personal electronic device. In some such embodiments, the at least one vehicle parameter is selected from the group consisting of vehicle speed, energy consumption, energy reserve, mileage, and direction.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 2c and 2d provide front views of a two-wheeled foldable electric vehicle in an open riding configuration (2c), and a compact folded configuration (2d) in accordance with embodiments of the invention.

FIGS. 2e and 2f provide back views of a two-wheeled foldable electric vehicle in an open riding configuration (2e), and a compact folded configuration (2f) in accordance with embodiments of the invention.

FIG. 12 provides a perspective view of a foldable electric vehicle having a personal electronic device docking station in accordance with embodiments of the invention.

DETAILED DESCRIPTION OF THE INVENTION

Turning now to the drawings, foldable electric vehicles and devices for charging such electric vehicles are described. In many embodiments, the foldable electric vehicle generally comprises a plurality of arms all cooperatively moveable between a folded position wherein the arms are in a compact configuration suitable for storing and transporting the vehicle, and an open position wherein the arms are in a riding configuration suitable for the operation of the vehicle. In many such embodiments the pivotable arms may have disposed thereon wheels, motors, charge storage devices, power distribution and control circuits, motor and vehicle controls and instruments, accessories and all other necessary devices and structures for the operation of the vehicle.

In some embodiments, the vehicle comprises two structural wheel-bearing armatures (front and rear arms), and a seat arm that are all pivotally interconnected along their lengths such that they may be moved between a closed position wherein the three arms are disposed roughly parallel to each other in a compact folded configuration, and an open riding configuration wherein a downward acute angle is formed between the two structural wheel-bearing arms, and the seat arm is disposed in a position to support a rider atop the vehicle.

In many embodiments, the pivot point between the three arms is disposed at the upper ends of the arms distal to the wheels and seat bearing ends thereof, to form an overall 'A-frame' configuration for the vehicle. In many other embodiments one of the structural arms is configured to enclose a power source, such as, for example, a battery or plurality of batteries. In many embodiments this power source enclosing arm is disposed as the front arm of the vehicle, and bears the front wheel thereof. In many embodiments, the pivotable second wheel-bearing arm includes one or more rear wheels at the distal end thereof. In some embodiments these wheels may be interconnected to the arm on either end of a truck assembly that is pivotable about a horizontal axis perpendicular to the axis of the rear arm such that the rider of the vehicle is capable of steering the vehicle by leaning in the desired direction of the turn. It will be understood that the rear wheel assembly may include a single wheel or multiple wheels interconnected via an axle.

The folding and locking mechanism of the vehicle, in many embodiments, interconnects the three arms of the vehicle in a configuration that allows the disengagement of the locking mechanism and the folding of the arms of the vehicle via the manipulation of one of the arms of the vehicle. In some such embodiments, the locking mechanism is disengaged by manipulating the seat-bearing arm of the vehicle. In other embodiments the locking mechanism of the vehicle includes a resilient member interconnected with the seat-bearing arm that urges the seat-bearing arm into the open and closed positions when the vehicle is placed into such configurations.

Figure 1A:
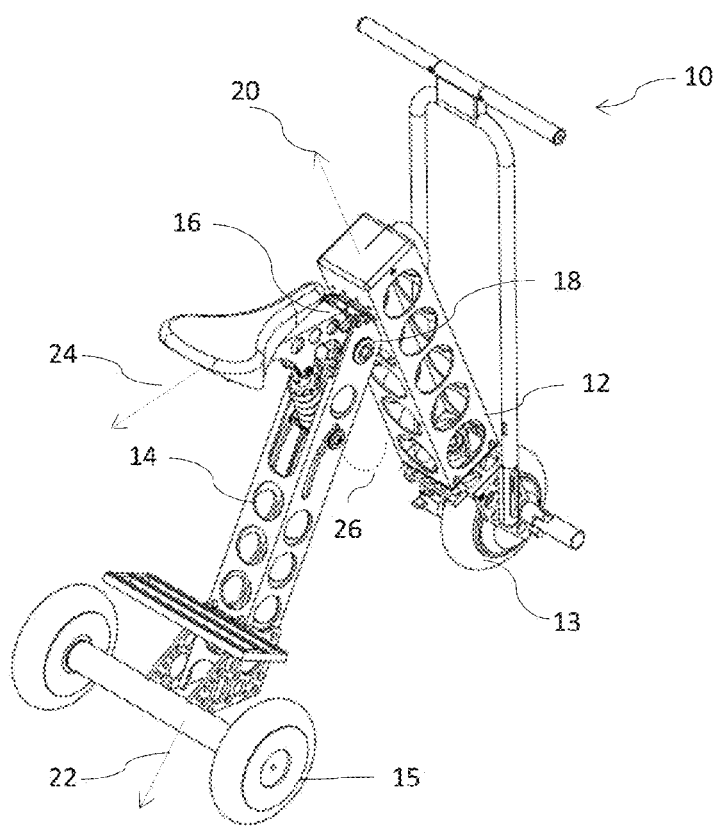
FIGS. 1a and 1b provide perspective views of a three-wheeled foldable electric vehicle in an open riding configuration (1a), and a compact folded configuration (1b) in accordance with embodiments of the invention.
Figure 1B:
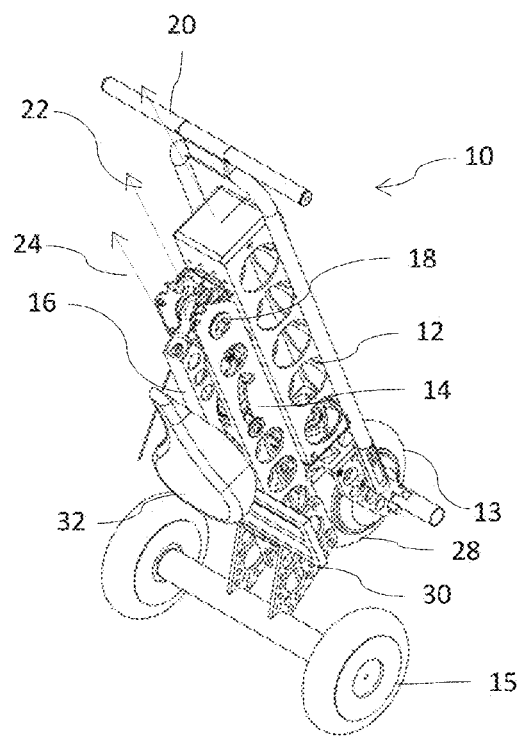
Figure 1C:
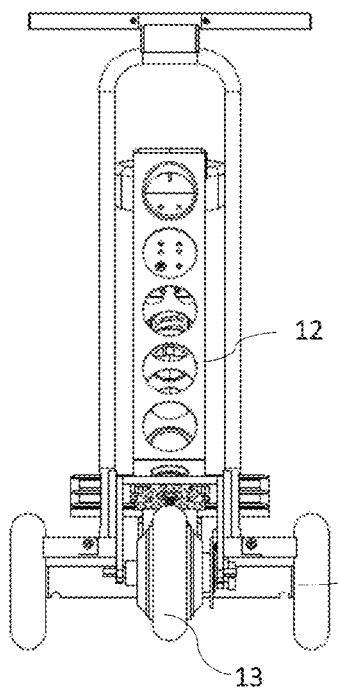
FIGS. 1c and 1d provide front views of a three-wheeled foldable electric vehicle in an open riding configuration (1c), and a compact folded configuration (1d) in accordance with embodiments of the invention.
Figure 1D:
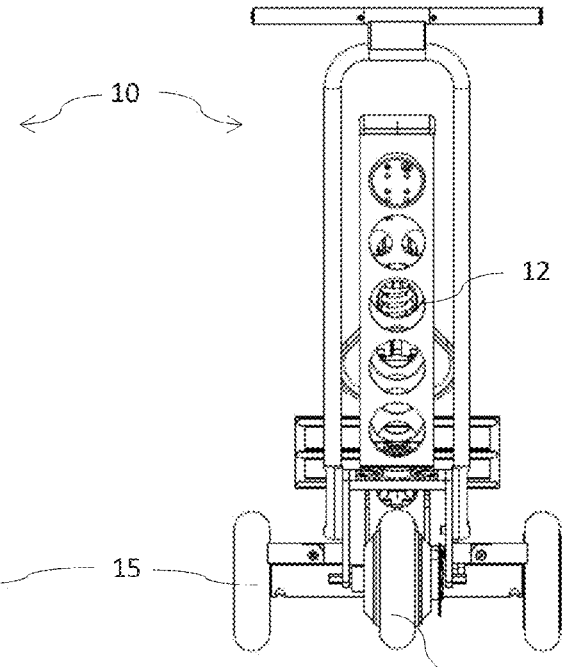
Figure 1E:
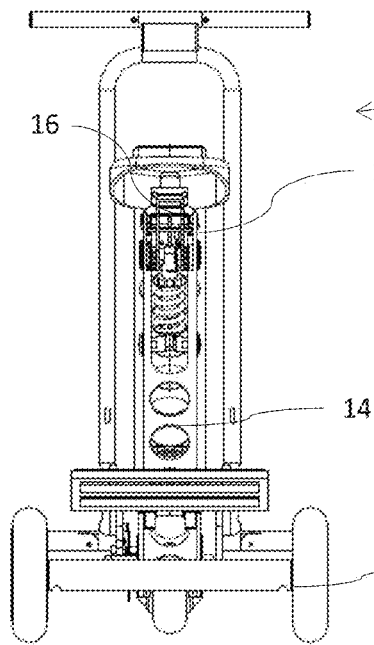
FIGS. 1e and 1f provide back views of a three-wheeled foldable electric vehicle in an open riding configuration (1e), and a compact folded configuration (1f) in accordance with embodiments of the invention.
Figure 1F:
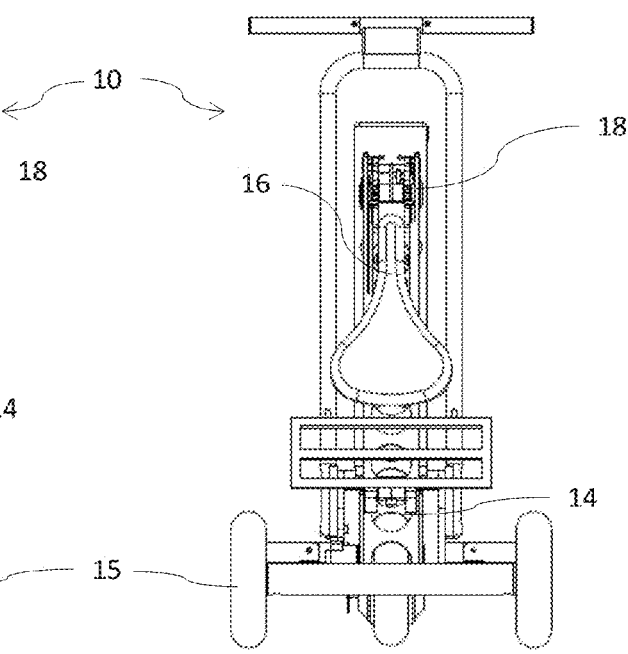
Figure 1G:
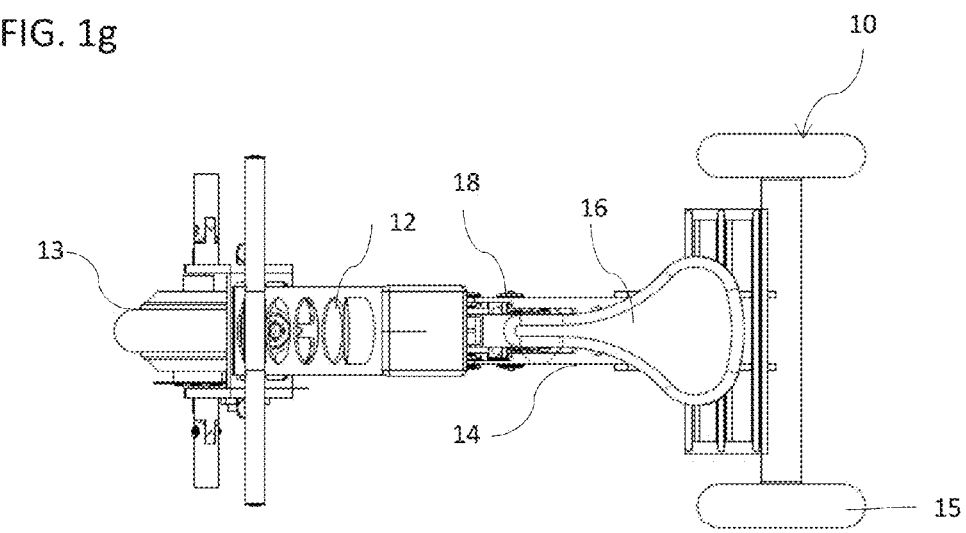
FIGS. 1g and 1h provide top views of a three-wheeled foldable electric vehicle in an open riding configuration (1g), and a compact folded configuration (1h) in accordance with embodiments of the invention.
Figure 1H:
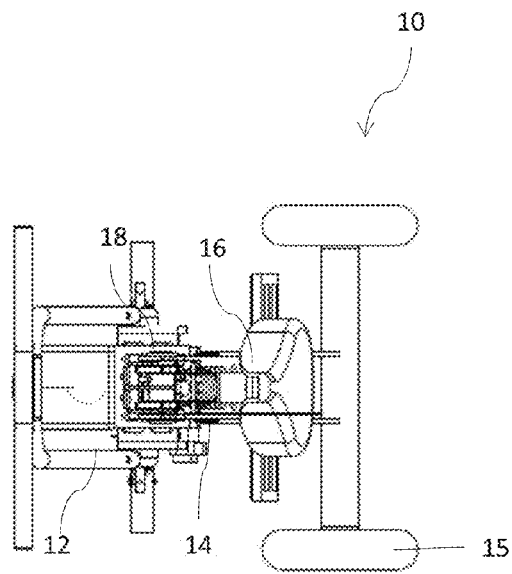
Figure 2A:
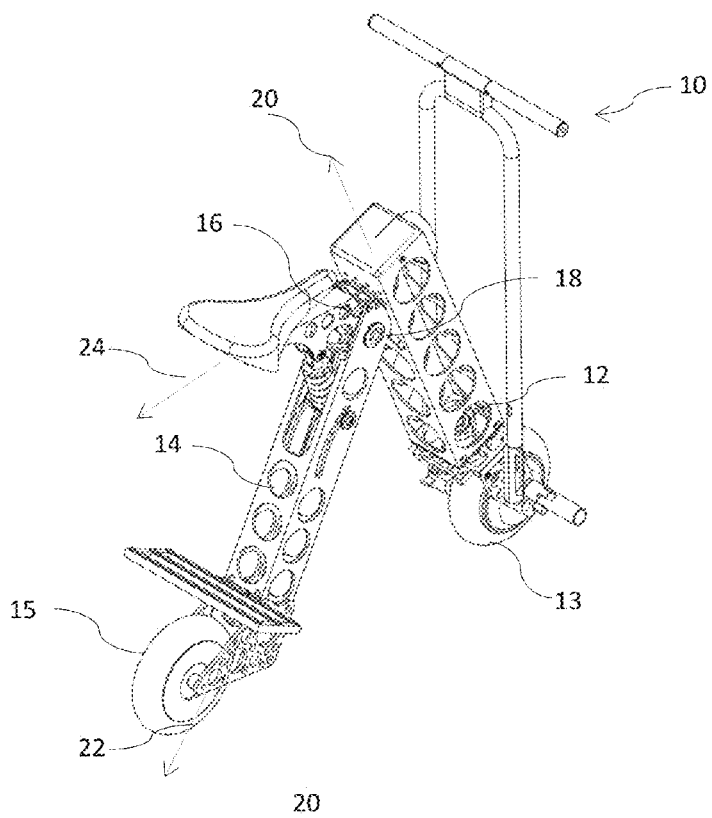
FIGS. 2a and 2b provide perspective views of a two-wheeled foldable electric vehicle in an open riding configuration (2a), and a compact folded configuration (2b) in accordance with embodiments of the invention.
Figure 2B:
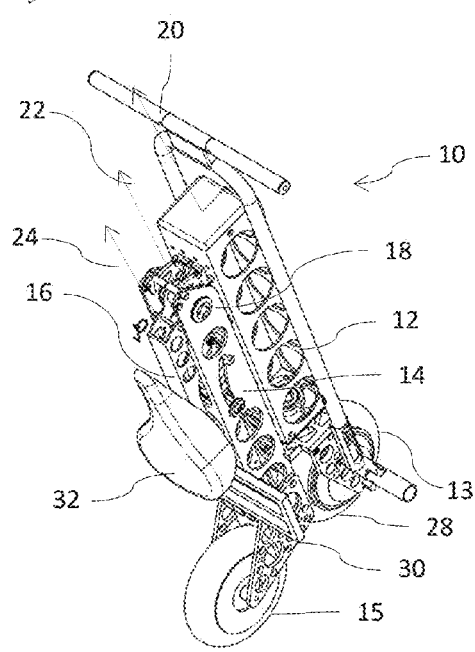
Figure 2G:
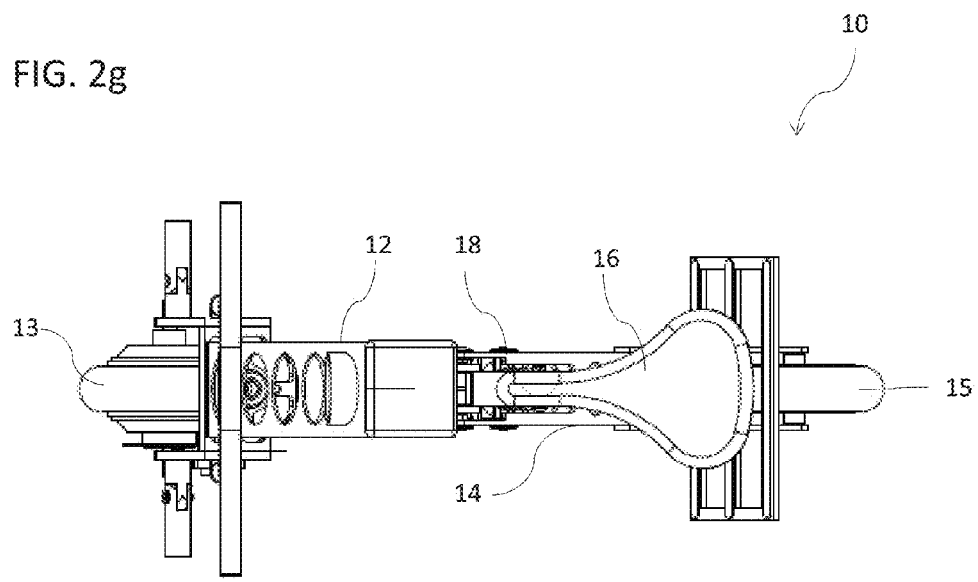
FIGS. 2g and 2h provide top views of a two-wheeled foldable electric vehicle in an open riding configuration (2g), and a compact folded configuration (2h) in accordance with embodiments of the invention.
Figure 2H:
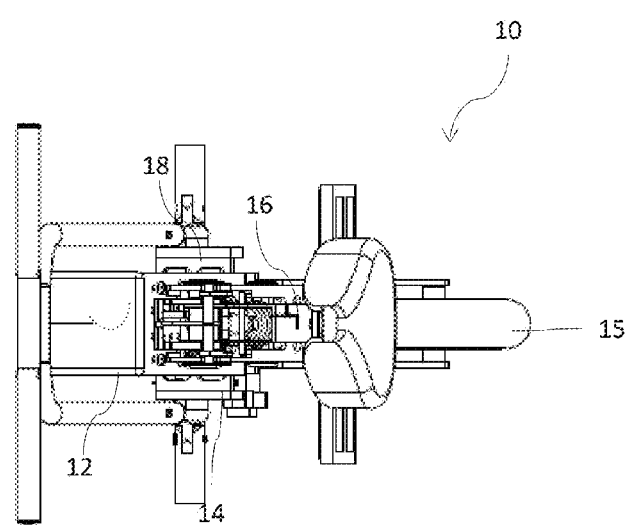

As shown in FIGS. 1a and 1b, in many embodiments a three-wheeled foldable vehicle is provided comprising at least three arms: a front wheel-bearing arm (12) having disposed at the distal end thereon at least a front wheel assembly (13), a rear wheel-bearing arm (14) having disposed at the distal end thereon at least a rear wheel assembly (15), and a seat-bearing arm (16) for supporting a rider while operating the vehicle. These arms are pivotally connected about a single pivot hinge (18) that allows movement of the arms from an open riding configuration, shown in one exemplary embodiment in FIG. 1a, to a folded compact configuration, shown in one exemplary embodiment in FIG. 1b.

As shown, in FIG. 1a, the relative arrangement of the arms of the vehicle in these configurations may be defined by the axial arrangement of the arms around the pivot hinge (18), wherein each arm is defined by an axis (20, 22 and 24). In some embodiments in the open riding configuration the front and rear arms (12 & 14) are positioned such that a downward acute angle (26) is created between the axes (20 & 22) of the two wheel-bearing arms. Although a particular angular arrangement is provide in FIG. 1a, it should be understood that any angle suitable to form a usable riding configuration may be formed depending on the specific arrangement and geometry of the wheels and arms desired. For example, a suitable angle may be determined by factors such as the distance between the wheels of the vehicle, the height of the seat to the ground, etc.

In addition, in some embodiments of this open riding configuration the seat-bearing arm (16) is pivoted such that its axis (24) is disposed at an angle relative to the ground such that a riding platform (28) is formed on which a rider may be seated to operate the vehicle. As shown in FIG. 1a, in some embodiments the riding platform (28) may be configured such that its axis (24) is roughly parallel to the ground. In other embodiments adjustment mechanisms may be provided to adjust the position of the riding platform relative to the wheel-bearing arms as desired by the rider. In such embodiments adjustments might include height relative to the ground, distance relative to the handlebars, angle relative to the pivot hinge (18), etc. Although one embodiment of a riding platform (28) comprising a bicycle-style seat is shown in FIG. 1a, it will be understood that the riding platform may take any form, style or shape suitable to support a rider.

As shown in FIG. 1b, in many embodiments, in the compact folded configuration the front, rear and seat arms (12, 14 & 16) are all pivoted about the pivot hinge (18) such that their axes (20, 22, & 24) are disposed roughly parallel to each other. In some embodiments of the vehicle, such as the one shown in FIG. 1b, the axes (20, 22, & 24) of the arms are disposed parallel on to the other, and the arms (12, 14 & 16) themselves are moved into a configuration in which they are positioned adjacent to one another. In one such embodiment, the pivoting of the arms comprises a scissoring motion about the pivot hinge such that the distal ends of each of the arms (28, 30 & 32) come together to face in a single direction, again as shown in FIG. 1b.

Additional views of the vehicle (10) of FIGS. 1a and 1b, in open and closed positions, including: front views (1c & 1d), rear views (1e and 1f), and top views (1g and 1h) are provided showing the elements described above.

Although the above description and the embodiments of the vehicle shown in FIGS. 1a to 1h, describe an electric vehicle having a three-wheel configuration (in which the front wheel assembly (13) comprises a single wheel and the rear wheel assembly (15) comprises two wheels), it will be understood that other wheel configurations may be provided that have considerably the same elements and operate in a manner commensurate to that described above. For example, FIGS. 2a to 2h provide perspective views (2a and 2b), front views (2c and 2d), rear views (2e and 2f), and top views (2g and 2h) of an electric vehicle (10) having substantially the same structure and function as described above with respect to FIGS. 1a to 1h comprising a two-wheel configuration (in which both the front (13) and rear (15) wheel assemblies comprises a single wheel).

Turning now to the detailed construction of the vehicle, several of the elements comprising the vehicle will be described, including the front and rear wheel-bearing arms, and the seat-bearing arm and all attendant structures and accessories. Examining first the front wheel-bearing arm, FIGS. 3a to 3e provide illustrations of embodiments of the vehicle (10) and the front wheel-bearing arm (12).

Figure 3A:
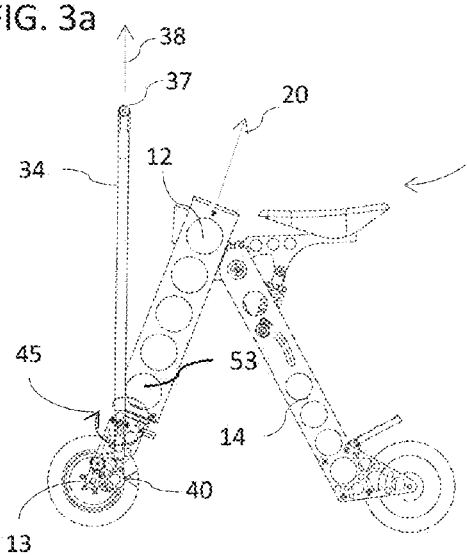
FIGS. 3a to 3d show side views of a foldable electric vehicle and the front wheel assembly and handlebar in an open riding configuration (3a & 3c), and a compact folded configuration (3b & 3d) in accordance with embodiments of the invention.
Figure 3B:
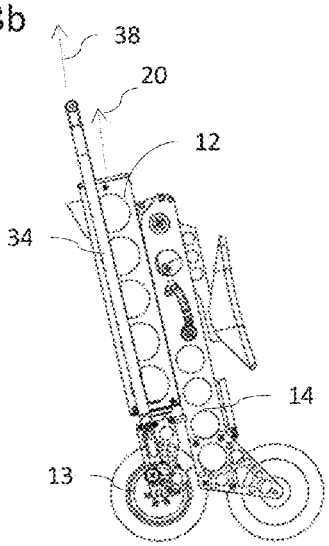
Figure 3C:
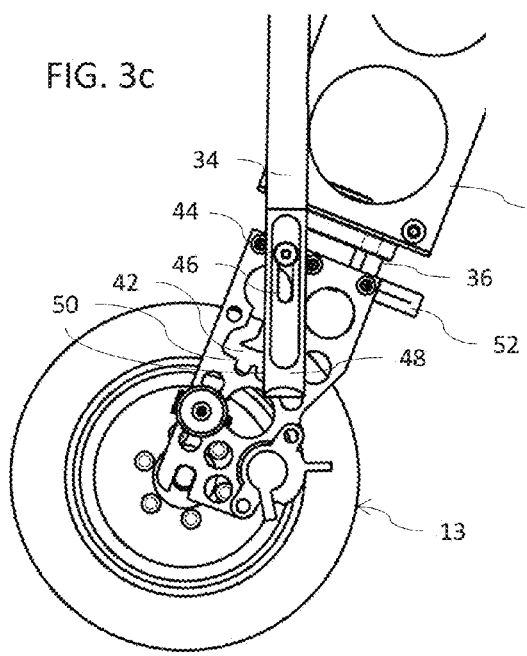
Figure 3D:
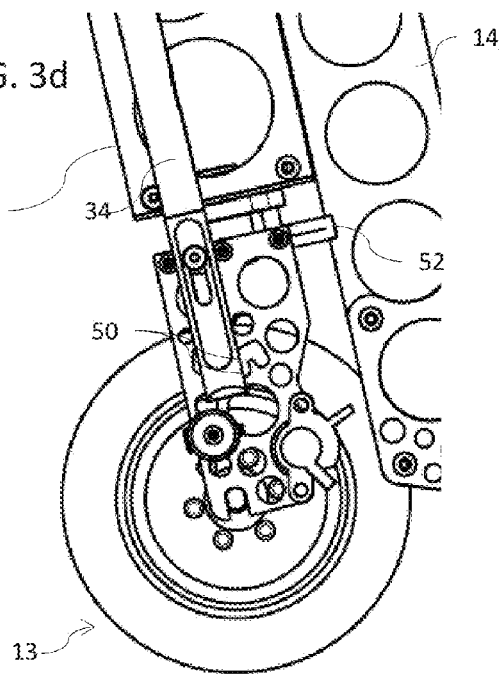

As shown in FIGS. 3a to 3d, in many embodiments the vehicle (10) comprises a front wheel-bearing arm (12) having at least one front wheel assembly (13) mounted thereto, and a steering mechanism, such as a handlebar or other suitable structure (34) interconnected therewith. In some such embodiments, the steering mechanism (34) can be used to alter the orientation of the front wheel assembly (13) relative to the vehicle, and thus to steer the vehicle when in the open/riding position (FIG. 3a), and to maneuver the vehicle when in the closed/compact position (FIG. 3b). Although in the embodiments shown in FIGS. 3a to 3d, the wheel assembly (13) is pivotally interconnected to the front wheel-bearing arm (12) through a rotatable pivot interconnection (36), in other embodiments the wheel assembly might be fixedly attached to the front wheel-bearing assembly, and the entire front wheel-bearing assembly could be pivotable relative to the remaining vehicle structure. Regardless, in many embodiments the steering mechanism may be interconnected relative to the wheel assembly and front wheel-bearing arm such that the orientation of at least the front wheel relative to the remainder of the vehicle may be altered.

Although a "T"-shaped handlebar steering mechanism (34) is shown in the figures, it will be understood that the steering mechanism may be of any shape suitable and dimension such that a rider may use the mechanism to alter the directional motion of the vehicle. For example, a "U"-shaped handle bar steering mechanism may be contemplated. In addition, in some embodiments the height of the steering mechanism may also be adjustable, such as, for example, via a telescoping mechanism, for convenience and comfort of use, and in some embodiments to allow the steering mechanism to be collapsed for storage such that the height of the handle bars do not extend above the height of the remainder of the vehicle. In embodiments, such as those shown in FIGS. 3a to 3e, having handles (37) that extend out from the sides of framework, such as in a "T" configuration the handle extensions may retract or fold into a more compact form.

In many embodiments, as shown schematically in FIGS. 3a to 3d, the steering mechanism (34) may be pivoted between an open position (FIGS. 3a and 3c), in which the axis (38) of the steering mechanism is angled away from the axis (20) of the front wheel-bearing arm (12), and a closed compacted position (FIGS. 3b and 3d), in which the axis of the steering mechanism is aligned along the vertical axis of the front wheel-bearing arm. In many embodiments, as shown in detail in FIGS. 3c and 3d, the steering mechanism (34) may be moved between the open and closed positions by sliding the lower end (40) of the steering mechanism along a locking channel (42) disposed on the wheel assembly (13) of the front wheel-bearing arm (12). In some such embodiments, the steering mechanism (34) may be interconnected with the wheel assembly (13) via an upper pivot pin (44) that is disposed within a pivot channel (46) formed in the steering mechanism, and a lower locking pin (48) disposed on the steering mechanism that moves within the locking channel (42) of the wheel assembly. Although the pins and channels are disposed in the illustrated embodiment in a particular configuration, it should be understood that pins and channels may be distributed between the wheel assembly and steering mechanism such that there is a constrained pivotable interconnection therebetween. In many embodiments, the lower locking pin (48) is configured to slide within the locking channel (42) and move up and down therein between various positions therealong thus causing the steering mechanism (34) to pivot about the upper pivot pin (44) relative to the wheel assembly (13) and the front wheel-bearing arm (12), as shown by the dashed arrows (45) in FIG. 3a.

In many embodiments, to allow the steering mechanism to move within the channel and lock into a desired position, an internal tension spring (not shown) may be provided in association with the steering mechanism (34) and one or more of the pins (44 and 48) such that the steering mechanism may be securely locked into a desired position. In some such embodiments, both locked positions of the handlebar may be disengaged by either pressing downwards or pulling upwards on the handlebar, as appropriate for the design and arrangement of the locking channel and pins, and then rotated to the desired lock position about the upper pivot pin (44) along the locking channel (42). For example, in the embodiments shown in FIGS. 3a to 3d, the locking positions of the locking channel (42) comprise a series of notches (50) formed along the lower edge of the locking channel. Accordingly, in such an embodiment a spring may be provided to resiliently urge the locking pin (48) into the notch (50) of the locking channel (42). Finally, although only a two-position angular arrangement is shown between the steering mechanism (34) and the front wheel-bearing arm (12), it should be understood that other angles may be formed, or the angle of the steering mechanism relative to the vehicle may be made continuously or incrementally adjustable to allow the rider to adjust the riding position of the vehicle. In many embodiments, such a function may be provided by forming different locking positions (50) along the locking channel (42).

In many embodiments, it may be desirable to prevent motion of the front wheel assembly relative to the vehicle in the compact folded or closed position, i.e., to lock the orientation of the wheel relative to the vehicle. In such embodiments a wheel locking mechanism may be provided to prevent the wheel and/or wheel assembly (13) from changing orientation relative to the vehicle in such a folded closed configuration. Although any suitable wheel locking mechanism may be provided, in some embodiments a tab (52) is provided on the pivotable portion of the wheel or wheel assembly (13) such that in the close folded configuration (FIGS. 3b and 3d) the tab engages the adjacent rear wheel-bearing assembly (14) or other immobile portion of the vehicle to prevent independent motion of the wheel or wheel assembly, and thereby a change in the orientation of the wheel and/or wheel assembly relative to the vehicle.

Figure 3E:
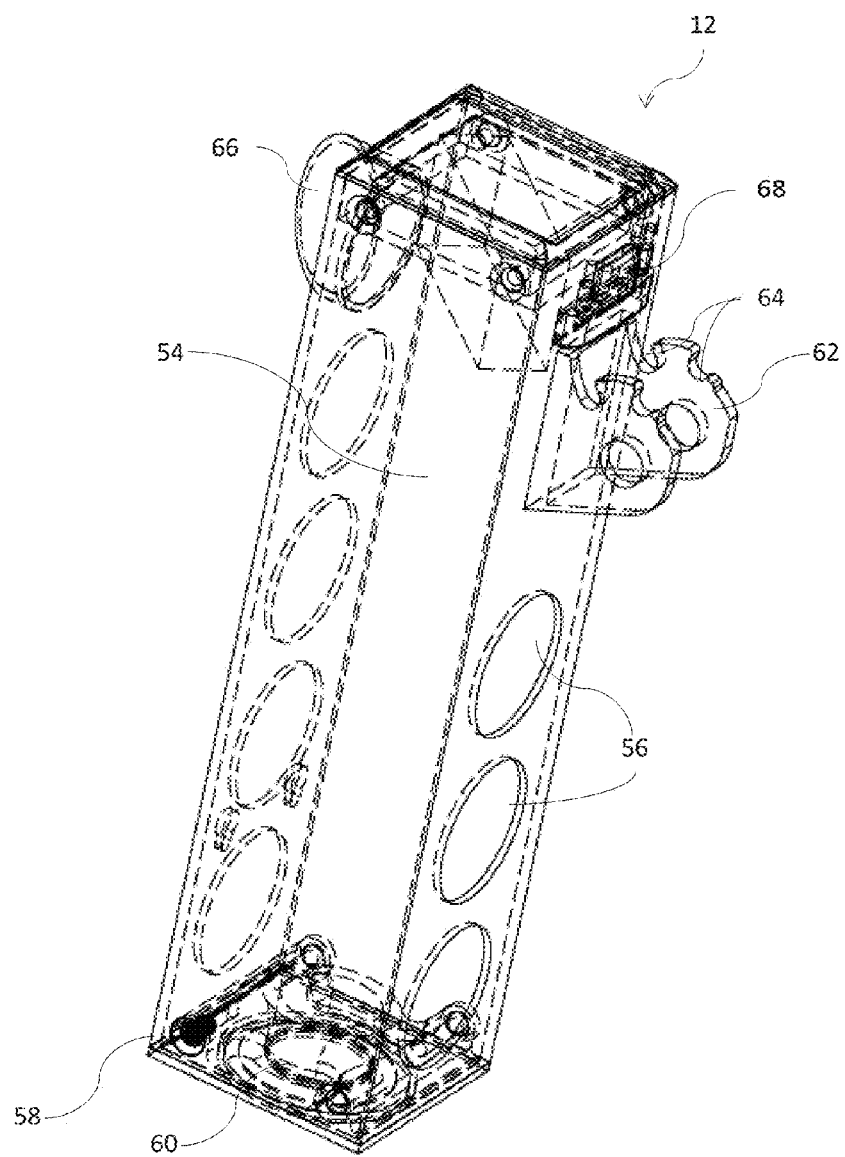
FIG. 3e provides a perspective transparent view of a front structural arm (3e) in accordance with embodiments of the invention.

Turning now to the construction of the front wheel-bearing assembly (12), as shown in FIG. 3e, in many embodiments the front wheel-bearing arm is formed of an elongated body that may be made hollow such that the body defines an interior volume (54). The arm may be formed from any material suitable to provide sufficient structural support to the vehicle, such as, for example, a metal, composite, or polymer. In many embodiments, as shown in FIG. 3e, the weight of the front wheel-bearing arm (12) may be lightened by including fenestrations (56) along the elongated body. Although certain fenestrations are shown in the figures, the number and configuration of such fenestrations may take any geometry or shape suitable to lighten the arm while maintaining the structural integrity of the arm.

In many embodiments, the front wheel-bearing arm (12) may comprise, at its lower end (58), an interconnection point (60) such that a wheel assembly may be interconnected therewith. In some such embodiments, such an interconnection may be pivotable such that the wheel assembly may pivot relative to the front wheel-bearing assembly.

In many embodiments, the front wheel-bearing arm (12) may further comprise a front main pivot hinge bracket (62) disposed along its length and configured such that the front main pivot hinge bracket may be cooperatively coupled with the main pivot hinge brackets provided on the rear wheel-bearing arm (14) and the seat-bearing arm (16) to form the vehicle main pivot hinge (18) to allow the front wheel-bearing arm (12) to pivot relative to the other arms (14 and 16) that form the structure of the vehicle. Such a front main pivot hinge bracket (62) may also comprise front locking mechanism elements (64) for engaging a cooperative locking mechanism on one or more of the other arms (14 and 16) of the vehicle to prevent unintended movement of the arms relative to one another. In some embodiments, as shown in FIG. 3e, the locking mechanism (64) comprises a series of locking grooves that are configured to engage with a cooperative locking pin disposed on the rear wheel-bearing arm (14).

The front wheel-bearing arm may also comprise certain accessories, such as, for example, lights (66), charging connections (68), personal electronic docking connections, (not shown), etc. Although the energy storage and vehicle propulsion systems may be distributed across the various arms and elements of the vehicle, in many embodiments the energy storage elements (53), such as, for example, one or more batteries may be disposed within the internal volume (54) of the front wheel-bearing arm along with any required electronics, electric interconnections, etc. necessary for the operation of the electric vehicle.

Figure 4:
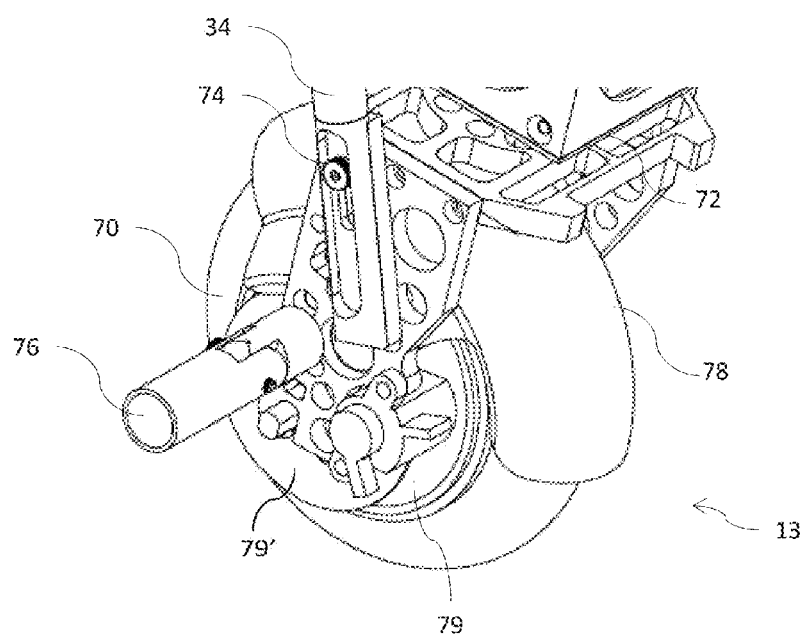
FIG. 4 provides a perspective view of a front wheel assembly in accordance with embodiments of the invention.

As shown in FIG. 4, the front wheel assembly (13) generally comprises a wheel (70) rotatable interconnected with the assembly, such as via an axle or other suitable rotatable interconnection. As described in relation to FIGS. 3a to 3e, the wheel assembly in many embodiments may also include a pivotable interconnection (72) to pivotally interconnect the wheel assembly to the front wheel-bearing arm (12). In many embodiments, the wheel assembly (13) may also comprise a steering mechanism interconnection (74) that may be configured to allow the steering mechanism (34) to pivot about the wheel assembly, thereby allowing the axis of the steering mechanism to be repositioned relative to the front wheel-bearing arm, and in turn the other arms of the vehicle. The front wheel assembly may also include front footrests (76), which may take any suitable form, such as, for example, a peg or pedal. Such a footrest may be foldable or retractable to reduce the profile of the footrest relative to the wheel assembly. Finally, the wheel assembly may include other accessories, such as, for example, a fender or mud-flap (78) mounted about the wheel (70) to decrease water or other debris from being splattered against the rider during operation. Although the motor or other propulsion means may be distributed across the vehicle and interconnected via suitable drive interconnections, in many embodiments the vehicle propulsion mechanism (not shown) may be disposed within the wheel assembly, such as within the hub (79) of the wheel (70) to provide motive force to the vehicle. In many such embodiments the propulsion mechanism may include an electric motor (79') disposed within the hub of the wheel (79) of the wheel assembly (13) and electrically interconnected with the energy storage elements disposed elsewhere in the vehicle.

Figure 5A:
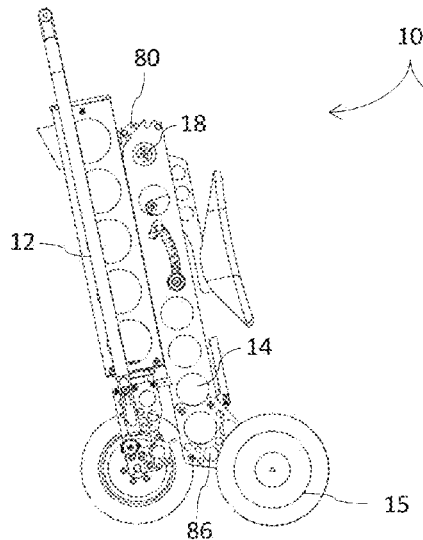
FIGS. 5a and 5b show side views of a foldable electric vehicle in a compact folded configuration (5a), and an open riding configuration (5b) in accordance with embodiments of the invention.
Figure 5B:
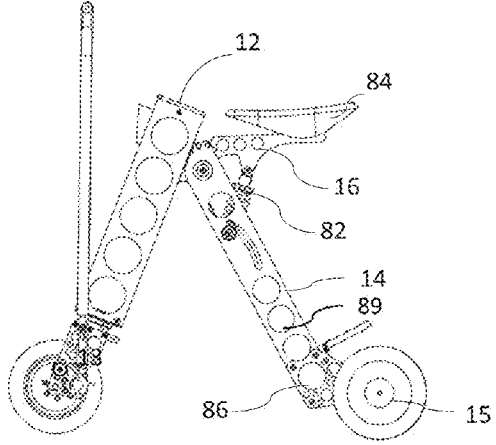

Examining now the rear wheel-bearing arm, FIGS. 5a to 5f provide views of embodiments of the vehicle (10) and the rear wheel-bearing armature (14). As shown in FIGS. 5a and 5b, in many embodiments the vehicle (10) comprises a rear wheel-bearing arm (14) having a seat-bearing arm (16) interconnected therewith. In such embodiments, the rear wheel-bearing arm (14) and seat-bearing arm (16) are both pivotally interconnected at a first end (80) with the front wheel-bearing assembly (12) via a pivot hinge assembly (18) about which both of the wheel-bearing structural arms and the seat-bearing post may all pivot relative to each other. The seat-bearing arm (16) in some such embodiments may be further interconnected with the rear wheel-bearing arm (14) through a fourth arm referred to herein as a seat support element (82) to provide further weight-bearing support to the seating platform (84) of the seat-bearing arm during operation of the vehicle. The rear wheel-bearing arm (14) further comprises a rear wheel assembly (15) at a second end (86) distal from the pivot hinge assembly (18), as will be described in greater detail below.

Figure 5C:
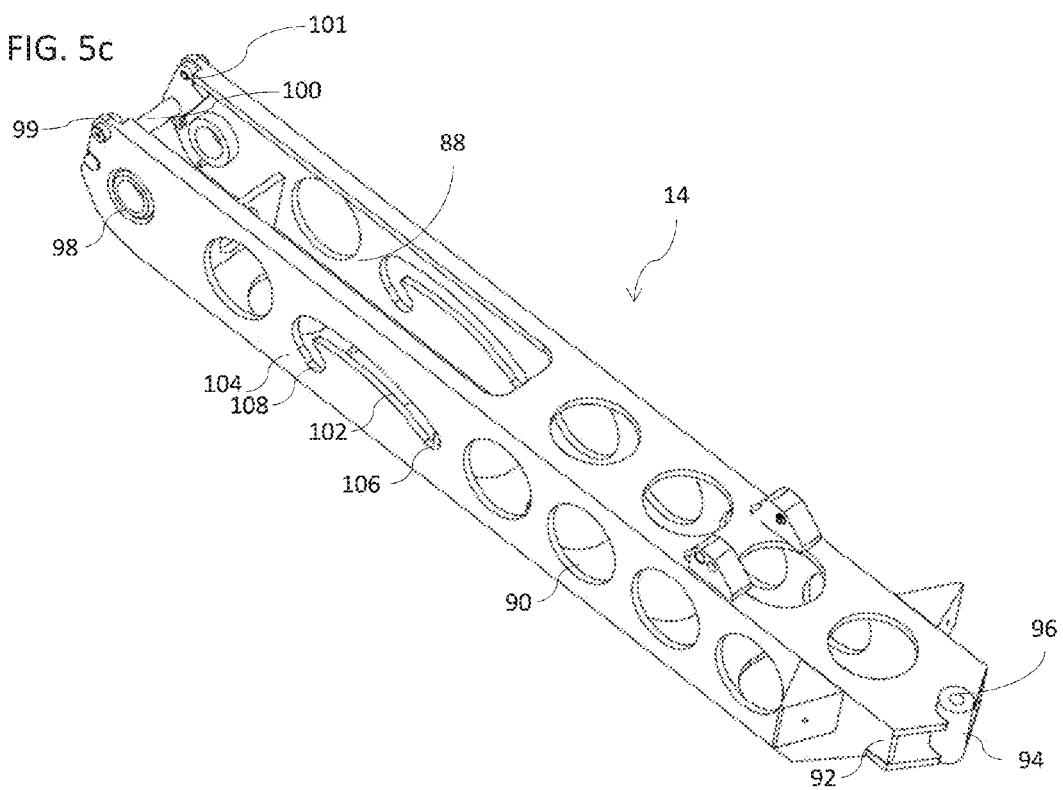
FIG. 5c provides a perspective view of a rear structural arm in accordance with embodiments of the invention.

Turning now to the construction of the rear wheel-bearing assembly (14), as shown in FIG. 5c, in many embodiments the rear wheel-bearing arm is formed of an elongated body that may be made hollow such that the body defines an interior volume (88). The arm (14) may be formed from any material suitable to provide sufficient structural support to the vehicle, such as, for example, a metal, composite, or polymer. In many embodiments, as shown in FIG. 5c, the weight of the rear wheel-bearing arm (14) may be lightened by including fenestrations (90) along the body thereof. Although certain fenestrations are shown in the figures, the number and configuration of such fenestrations may take any geometry or shape suitable to lighten the arm while maintaining the structural integrity of the arm.

As further shown in FIGS. 5a to 5c, in many embodiments, the rear wheel-bearing arm (14) may comprise, at its lower end (92), an interconnection point (94) such that a wheel assembly may be interconnected therewith. In some such embodiments, such an interconnection may comprise a pivot point (96) such that the wheel assembly may pivot relative to the rear wheel-bearing assembly, as will be described in greater detail below.

In many embodiments, as shown in FIGS. 5a to 5c, the rear wheel-bearing arm (14) may further comprise a rear main pivot hinge bracket (98) disposed along its length and configured such that the rear main pivot hinge bracket may be cooperatively coupled with the main pivot hinge brackets on the other arms (12 and 16) to combine to form the vehicle main pivot hinge (18) to allow the rear wheel-bearing arm (14) to pivot relative to the other arms (12 and 16) that form the structure of the vehicle. Such a rear main pivot hinge bracket (98) may also comprise a locking mechanism (99) configured to engage a cooperative locking mechanism on one or more of the other arms (12 and 16) of the vehicle to prevent unintended movement of the arms relative to one another. In some embodiments, as shown in FIG. 5c, the locking mechanism (99) may comprise a movable pin (100) and arm (101) configured to engage cooperative locking grooves on the rear wheel-bearing arm (103), front wheel-bearing arm and cooperative locking portions on the seat-bearing arm, as will be described in greater detail below.

In many embodiments the rear wheel-bearing arm (14) also comprises a seat-bearing arm support groove (102) configured to cooperatively and slidingly engage the seat-bearing arm support (82). In some embodiments, as shown in FIG. 5c, the seat-bearing arm support groove (102) delineates a curved path along which the seat-bearing arm support (82) may slidingly travel between a first position (104) at which the seat-bearing arm (16) is locked into a riding position where the seat-bearing arm is extended outward away from the rear wheel-bearing arm, and a second position (106) at which the seat-bearing arm is locked into a compact position where the seat-bearing arm is folded against or flush with the rear wheel-bearing arm. In some such embodiments, the path includes locking positions, formed for example of notches (108) at either end of the groove (102) where the riding position is engaged when the supporting member is locked into position in the slot higher up along the structural arm (104), and where the compacted position is engaged when the supporting member is locked into position in the slot lower down along the structural arm (106). As will be discussed in greater detail below, the seat-bearing arm support (82) may be formed of a resilient member (125), and configured such that when said seat-bearing arm (16) is pivoted into the locking position (106) of the groove (102) the resilient member is placed into tension such that a resilient locking force is applied to lock the seat-bearing arm into position against the adjacent wheel-bearing arm. In addition, although not shown, in some embodiments a resilient spring may be provided to restrain the seat-bearing arm support within the groove and notches and to assist in directing it along the groove during operation.

Although not shown, other accessories may be included with the rear wheel-bearing arm, including lights, charging connections, personal electronic docking connections, luggage racks, etc. Although the energy storage and vehicle propulsion systems may be distributed across the various arms and elements of the vehicle, in many embodiments the energy storage elements (89), such as, for example, one or more batteries may be disposed within the internal volume (88) of the rear wheel-bearing arm along with any required electronics, electric interconnections, etc. necessary for the operation of the electric vehicle.

Figure 6A:
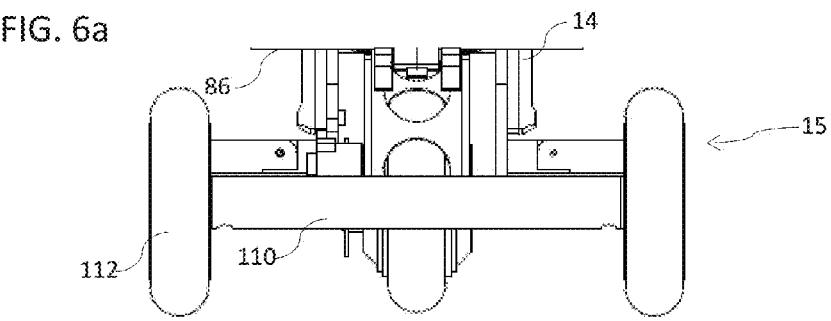
FIGS. 6a to 6d provide views of exemplary rear wheel assemblies and components in accordance with embodiments of the invention.
Figure 6B:
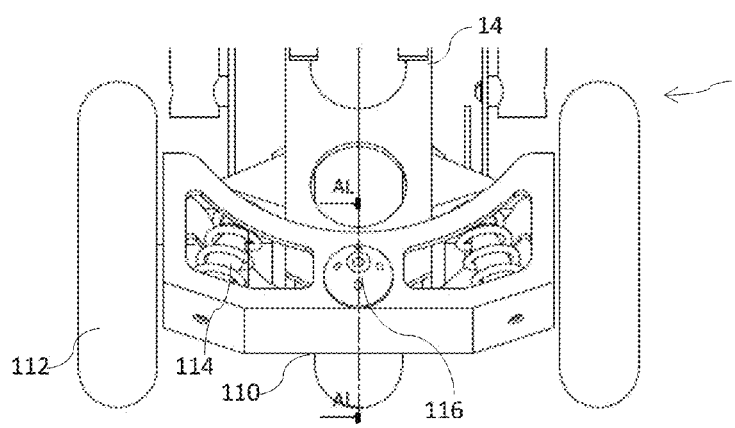
Figure 6C:
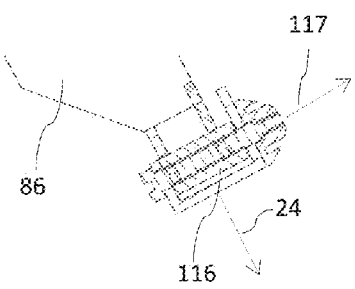
Figure 6D:
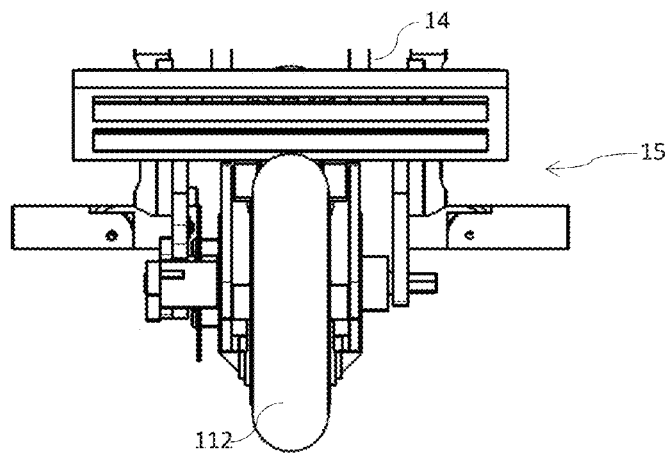

As described above a rear wheel assembly (15) is mounted to the lower end (86) of the rear wheel-bearing arm (14). As shown in FIGS. 6a to 6d, this rear wheel assembly may comprise one or multiple wheels in accordance with embodiments of the vehicle. In many embodiments the rear wheel assembly (15) comprises an axle (110) fixedly attached at the lower end (86) of the rear wheel-bearing arm (14). In some embodiments this fixed axle may comprise a plurality of wheels (112) as shown in FIG. 6a, or a single wheel as shown in FIG. 6d. In some embodiments the rear wheel assembly (15) may include resilient members (114), such as shock absorbing springs, to provide a shock dampening to the vehicle. In some such embodiments, the wheels of the rear wheel assembly may also be affixed to the rear wheel-bearing arm (14) in a configuration that would allow the wheels to move relative to the rear wheel-bearing arm. In one such embodiment, illustrated in FIGS. 6b and 6c, the rear wheel assembly (15) is pivotally interconnected to the rear wheel-bearing arm (14) via a rear wheel pivot hinge (116) such that the wheels (112) of the rear wheel assembly are pivotable about a horizontal axis (117) perpendicular to the axis (24) of the rear arm such that the rider of the vehicle is capable of steering the vehicle by leaning in the desired direction of the turn. (A cross section of such a pivotable interconnection is shown in FIG. 6c. This is cross-section AL of FIG. 6b.)

Finally, it will be understood that in many embodiments either the front or rear wheel assemblies may be configured as a removable and/or interchangeable structure, such that the wheels of the vehicle may be removed and the vehicle can be reconfigured between a single or dual-wheel design as desired by the user. This interchangeability can be accomplished by interconnecting one or both of the front or rear wheel assemblies (whether single or dual wheel design) via removable bolts, or a quick-connect attachment, such as, for example, a spring-loaded pin, latch, or other coupling. In embodiments where a two-wheel vehicle design is desired, the vehicle may further include a kickstand or otherwise retractable support, such that the vehicle may stand when unattended by the user.

Figure 7A:
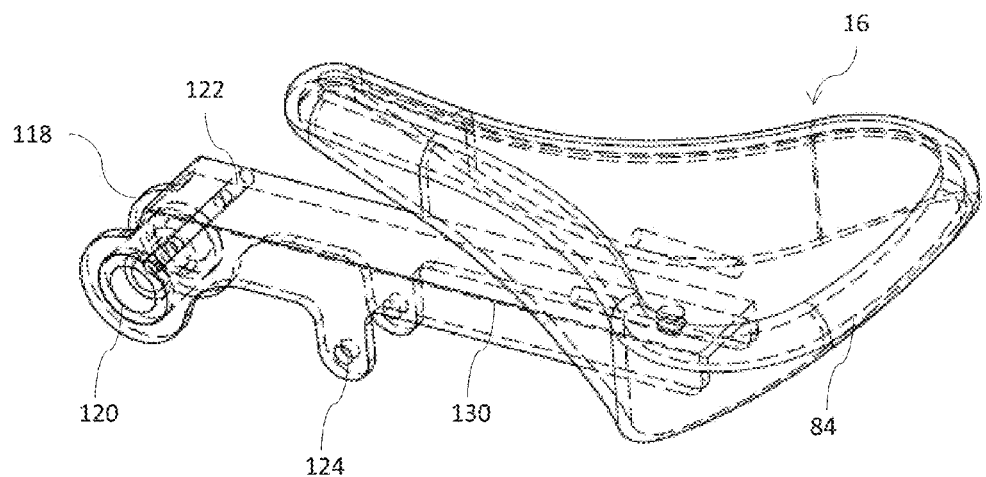
FIGS. 7a and 7b provide perspective views of a seat-bearing arm (7a) and a seat resilient member (7b) in accordance with embodiments of the invention.
Figure 7B:
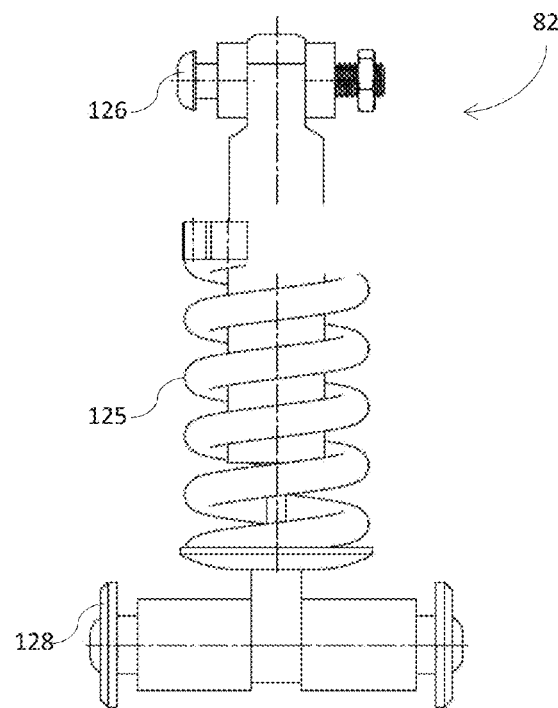

Examining now the seat-bearing arm, FIGS. 7a and 7b provide perspective views of the seat-bearing arm (16) and the seat-bearing arm support (82), respectively. As shown in FIG. 7a, in many embodiments the seat-bearing arm (16) generally comprises an elongated arm having at one end (118) a seat main pivot hinge bracket (120) and a seating platform (84) at an opposite end thereof. In some embodiments the seat main pivot hinge bracket (120) is configured to cooperatively interconnect with the main pivot hinge brackets of the front and rear wheel-bearing arms (12 and 14) to form the main vehicle hinge pivot (18) to allow the seat-bearing arm (16) to pivot relative to the other arms (12 and 14) that form the structure of the vehicle. Such a seat pivot hinge bracket (120) may also comprise a locking mechanism configured to engage a cooperative locking mechanism on one or more of the other arms (12 and 16) of the vehicle to prevent unintended movement of the arms relative to one another. In some embodiments, as shown in FIG. 7a, the locking mechanism may comprise a movable lock disengagement pin (122) configured to engage cooperative locking arms on the rear wheel-bearing arm such that the engagement and disengagement of the locking mechanism is activated by manipulating the seat-bearing arm, as will be described in greater detail below.

In many embodiments, the seat-bearing arm (16) also comprises a seat-bearing arm support bracket (124) for pivotally interconnecting the seat-bearing arm with a seat-bearing arm support member (82). In some embodiments the seat-bearing arm support member may be formed of a resilient member (125), such as, for example, a shock absorber, as shown in FIG. 7b. In such embodiments, the resilient seat-bearing arm supporting member (82) is pivotally interconnected with the seat-bearing arm (16) at one end through a seat-bearing support pin (126) (or other suitable cooperative pivotable interconnection element), and slidingly interconnected with the rear wheel-bearing arm (14) at its second end through a sliding pin (128) (or other suitable cooperative sliding interconnection element), to form a triangulated support structure that cantilevers the seat-bearing arm (16) into a riding position in the open/riding configuration of the vehicle to dampens the shocks or bumps of the road such that the rider experiences a smoother ride. In addition, as will be discussed in greater detail below, the resilient member (125) of the seat-bearing arm support (82) may also be configured such that when said seat-bearing arm (16) is pivoted into the locking position the resilient member is placed into tension such that a resilient locking force is applied to lock the seat-bearing arm into position against the adjacent wheel-bearing arm.

The seat-bearing arm (16) may also comprise certain accessories, such as, for example, lights, charging connections, personal electronic docking connections, (not shown), etc. Although the energy storage and vehicle propulsion systems may be distributed across the various arms and elements of the vehicle, in many embodiments the energy storage elements (129), such as, for example, one or more batteries may be disposed within the internal volume (130) of the seat-bearing arm along with any required electronics, electric interconnections, etc. necessary for the operation of the electric vehicle. The arm may be formed from any material suitable to provide sufficient structural support to the vehicle, such as, for example, a metal, composite, or polymer. Although not shown, in many embodiments the weight of the front wheel-bearing arm may be lightened by including fenestrations along the elongated body thereof. Any number and configuration of such fenestrations may take any geometry or shape suitable to lighten the arm while maintaining the structural integrity of the arm. The position of the seat-bearing arm (16) and/or the seat platform (84) may be adjustable relative to the remainder of the vehicle. In such embodiments adjustments might include height relative to the ground, distance relative to the handlebars, angle relative to the main vehicle pivot hinge (18), etc. Although one embodiment of a seating platform (84) comprising a bicycle-style seat is shown in FIG. 7*a*, it will be understood that the riding platform may take any form, style or shape suitable to support a rider.

As shown in FIGS. 8*a* to 8*e*, in many embodiments the vehicle (10) includes a main vehicle pivot hinge assembly (18) about which both of the wheel-bearing structural arms (12 and 14) and the seat-bearing (16) arm are pivotally connected. In addition, the seat-bearing arm support (82) may also be configured such that when said seat-bearing arm (16) is pivoted into the locking position the resilient member is placed into tension such that a resilient locking force is applied to lock the seat-bearing arm into position against the adjacent wheel-bearing arm.

As shown in detail in FIGS. 8*b* to 8*e*, each of the arms includes a cooperative pivot hinge bracket (62, 98 and 120), each of which engage and pivot about a main pivot pin (132). An exemplary embodiment of the assembly of these elements into the main vehicle pivot hinge assembly (18) is shown in cross-section in FIG. 8*b*. As shown, in many embodiments the cooperative pivot hinge brackets are disposed in a nested arrangement forming a hollow pivot passage (134), wherein the seat pivot hinge bracket (120) forms the innermost element, the rear pivot hinge bracket (98) the outermost element, and the front pivot hinge bracket (62) is disposed therebetween, although this configuration may be reordered without effecting the operation or function of the folding function of the vehicle. The main pivot pin (132) is inserted through the hollow pivot passage (134) to interconnect the three arms in a pivotable arrangement.

Figure 8A:
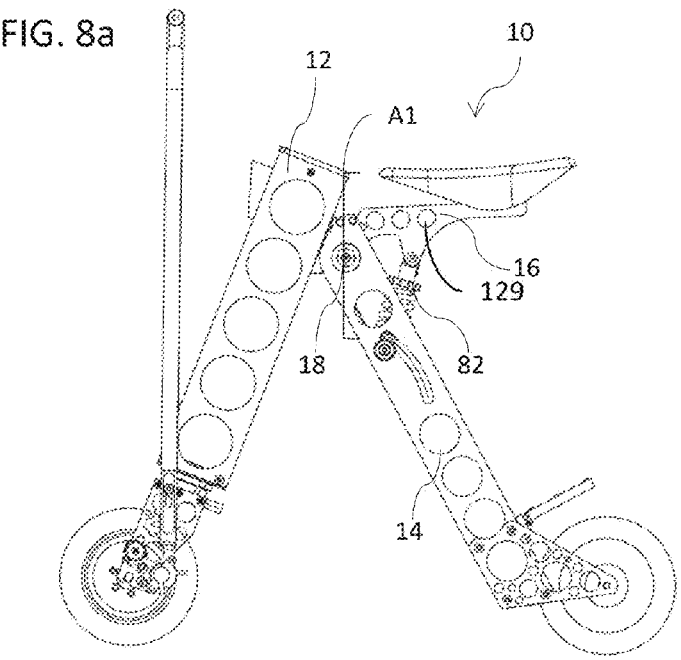
FIGS. 8a to 8e provide perspective views of cooperative main hinge components for a front wheel-bearing arm (8a), a rear wheel-bearing arm (8b), a seat-bearing arm (8c) in accordance with embodiments of the invention, a side assembly view (8d) of the main pivot hinge of the vehicle, and a cross-sectional view (8e) of the main pivot hinge assembly along view A1 of FIG. 8d in accordance with embodiments of the invention.
Figure 8B:
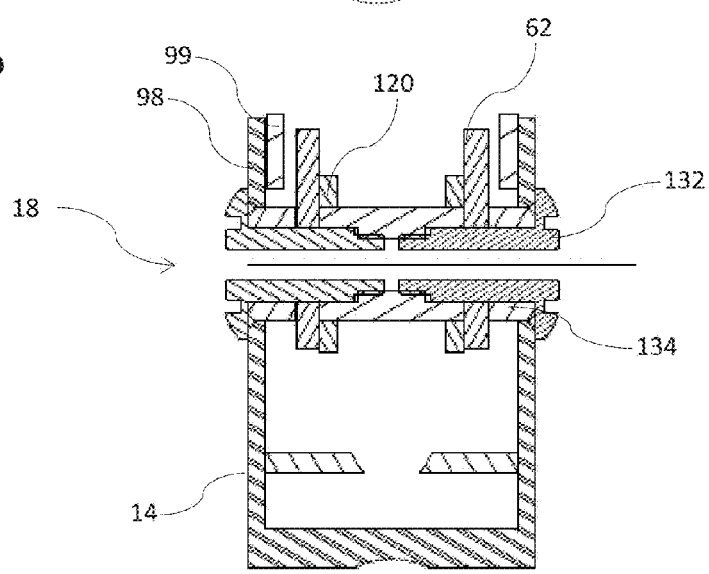
Figure 8C:
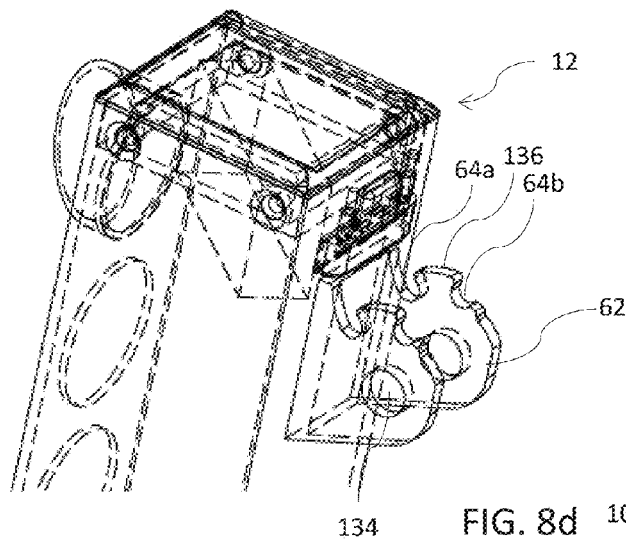
Figure 8D:
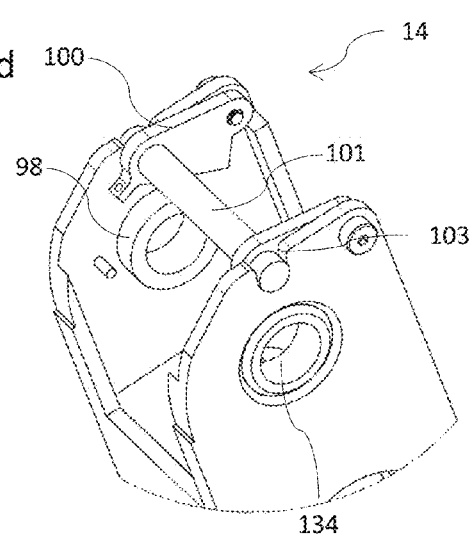
Figure 8E:
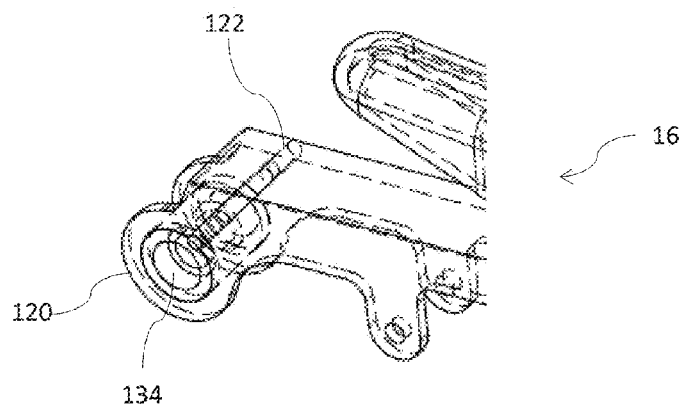
Figure 9A:
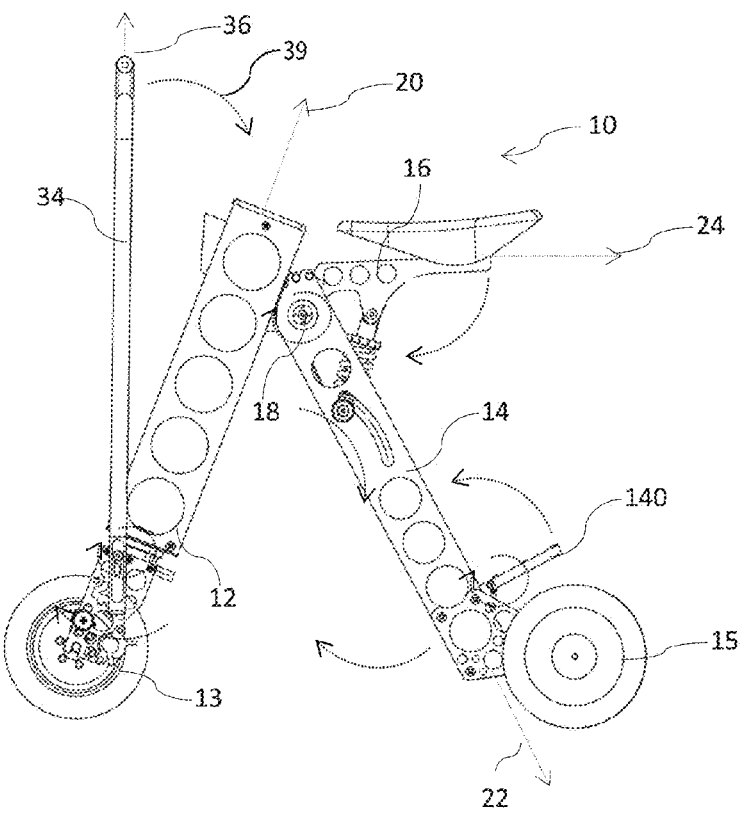
FIGS. 9a and 9b provide side views of a three-wheeled foldable electric vehicle in an open riding configuration (9a), and a compact folded configuration (9b) in accordance with embodiments of the invention.
Figure 9B:
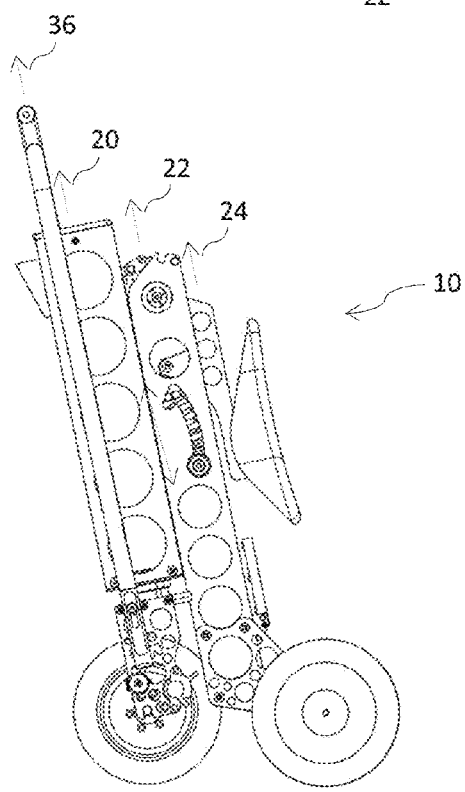
Figure 9C:
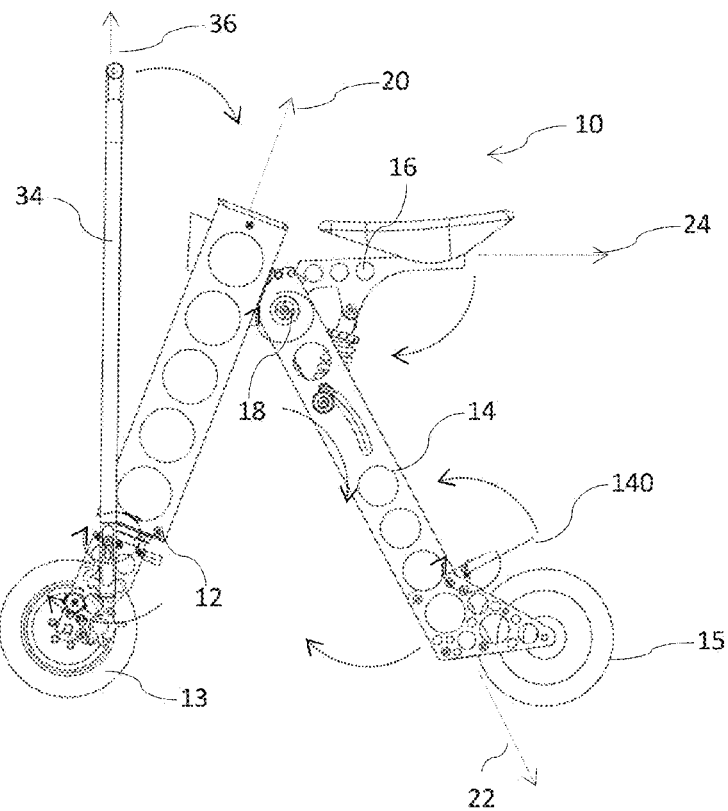
FIGS. 9c and 9d provide side views of a two-wheeled foldable electric vehicle in an open riding configuration (9c), and a compact folded configuration (9d) in accordance with embodiments of the invention.
Figure 9D:
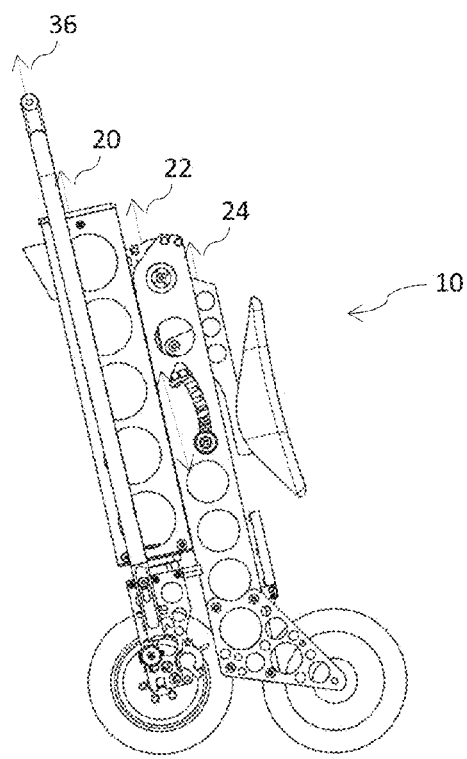

In many embodiments, as will be described in relation to FIGS. 8*c* to 8*e*, the main vehicle pivot hinge assembly (18) may further comprise a cooperative locking mechanism configured to be moved between a first locking position where the vehicle, including structural arm and seat-bearing post, are disposed and secured in the open/riding position, and a second locking position where the vehicle is disposed and secured in the closed/compacted position. Although such a cooperative locking mechanism may take any suitable form, in some embodiments, as shown in the figures, the mechanism may take the form of a pin and groove arrangement. In one such embodiment, a pivotable arm (100) and pin (101) disposed in association with the rear pivot hinge bracket (98) is configured to disengage and engage locking grooves (64) formed into the front pivot hinge bracket (62) through the action of seat lock disengagement pin (122) disposed on the seat-bearing arm (16) such that the arms (12 and 14) are prevented from pivoting in relation to each other while the pin (101) is engaged in one of the locking grooves (64). As shown, two positions are described (64*a* and 64*b*). As will be described in greater detail below, in embodiments the locking pin (101) is disengaged from the open/riding position (groove 64*a*) and the closed/compacted position (groove 64*b*) by pulling up on the seat-bearing arm (16) such that disengagement pin (122) engages arm (100), thereby lifting pin (101) out of groove (64). In some such embodiments, the locking pin (101) moves between the locking positions (64*a* and 64*b*) by sliding along the top edge (136) of the rear pivot hinge assembly (62). Again, it should be understood that although a specific arrangement of cooperative locking elements are described, any suitable locking mechanism and arrangement of elements may be provided. In many embodiments, such locking mechanisms and arrangements are configured such that the locking mechanism is disengaged by lifting the seat-bearing arm. Likewise, although only two locking positions are described above, it will be understood that intermediary locking positions may be defined such that desirable vehicle configurations may be stably formed.

FIGS. 9*a* to 9*d* provide schematics showing the movement (arrows) of the various elements of the vehicle (10) relative to one another. As shown, in addition to the wheel and seat-bearing arms (12, 14 & 16), other elements of the vehicle may be provided which cooperate in forming the open and compacted forms of the vehicle, including steering mechanism (34), in which the axis (38) of the handlebars may be pivoted between a position having an angular offset (39) from the axis (20) of the front wheel-bearing arm (12), and a position where the axis of the handlebars is parallel to the axis of the front wheel-bearing arm. The seat-bearing arm (16), which may also be configured such that when said seat-bearing arm support (82) is pivoted into the locking position the resilient member (125) is placed into tension (as shown by arrows in FIGS. 9*b* and 9*d*) such that a resilient locking force is applied to lock the seat-bearing arm into position against the adjacent wheel-bearing arm. Additionally, a storage rack (140) or other similar accessories could be provided that would be pivotable between an open position where a platform is provided suitable for holding objects, and a compacted position where the platform is folded against the body of the vehicle. It should be understood that though the luggage rack is shown disposed on the rear wheel-bearing arm, a similar structure could be disposed on other portions of the vehicle.

Turning now to the operation of the folding mechanism of the electric vehicle (10), as described above, and as will be discussed in relation to FIGS. 10*a* to 10*k*, in many embodiments the two wheel-bearing arms (12 and 14), and the seat-bearing arm (16) of the vehicle (10) are all pivotally interconnected at the same pivot point (18) such that a single folding mechanism operates to moveably reposition all the arms of the vehicle cooperatively. As shown, in many embodiments the folding mechanism comprises a central hinge pin (18) about which each of the arms (12, 14 and 16) are pivotally interconnected. A locking mechanism (99) comprising, in many embodiments, a pin and groove arrangement, disposed at the proximal end of the rear wheel-bearing arm (14) may also be provided to lock the arms of the vehicle into open and compact configurations. In many such embodiments the locking mechanism (99) is disengaged by manipulating the seat-bearing arm (16), such as, for example, by lifting upward on the arm.

Figure 10A:
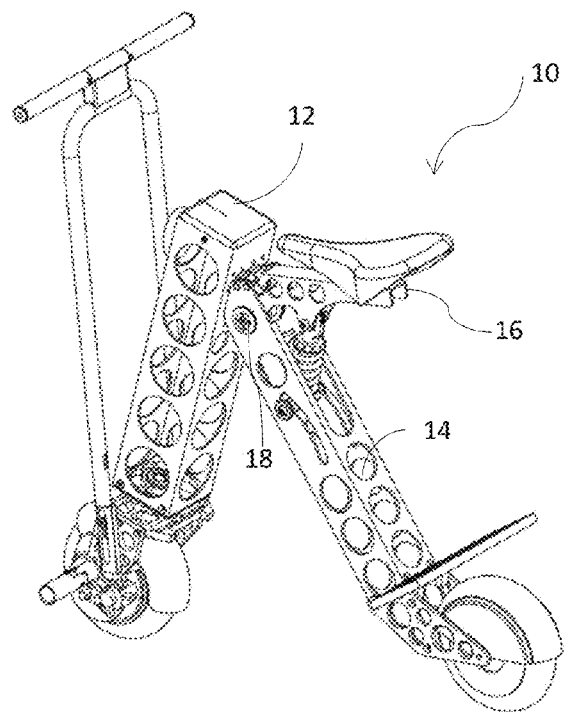
FIGS. 10a to 10k provide perspective views of a foldable electric vehicle and the folding mechanism in an open riding configuration (10a & 10b), in a series of intermediate positions between an open riding configuration and a compact folded configuration (10c to 10h), and in a compact folded configuration (10i to 10k) in accordance with embodiments of the invention.
Figure 10B:
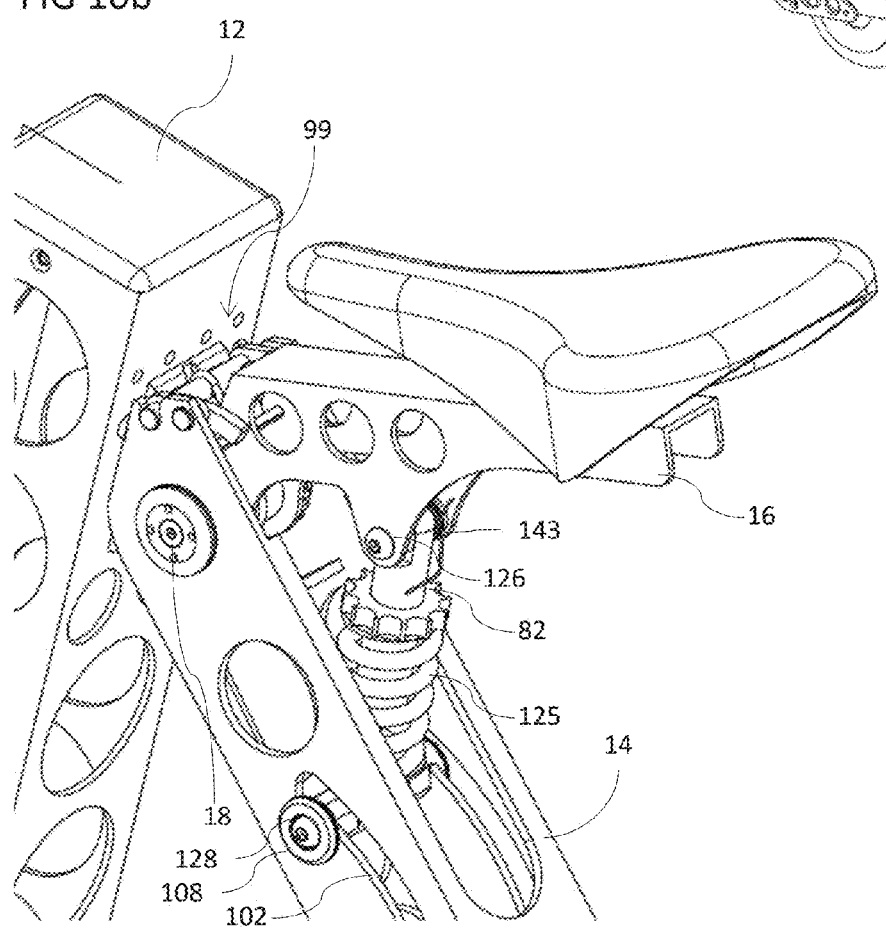

As shown in FIGS. 10a and 10b, in many embodiments the seat-bearing arm (16) may also be pivotally connected with a resilient supporting member (82), such as, for example, a shock absorber to form a triangulated support structure that cantilevers the seat post into a riding position and dampens the shocks or bumps of the road such that the rider experiences a smoother ride. In such embodiments, the resilient supporting member may be pivotally interconnected (126) with the seat arm (16) at one end, such as, for example, via a pivot pin, and slidingly interconnected (128) with the rear wheel-bearing arm (14) at its second end. In such embodiments, the resilient supporting member (82) may slide within a channel or slot (102) formed into the rear wheel-bearing arm between upper (108) and lower (106) locking positions.

Figure 10C:
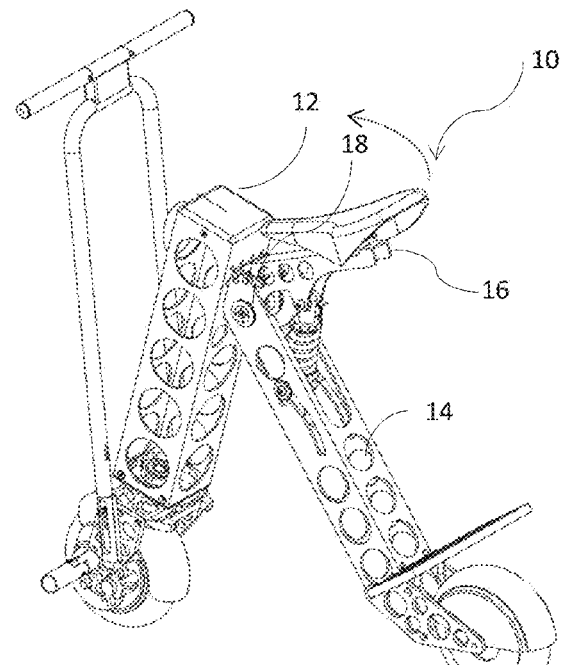
Figure 10D:
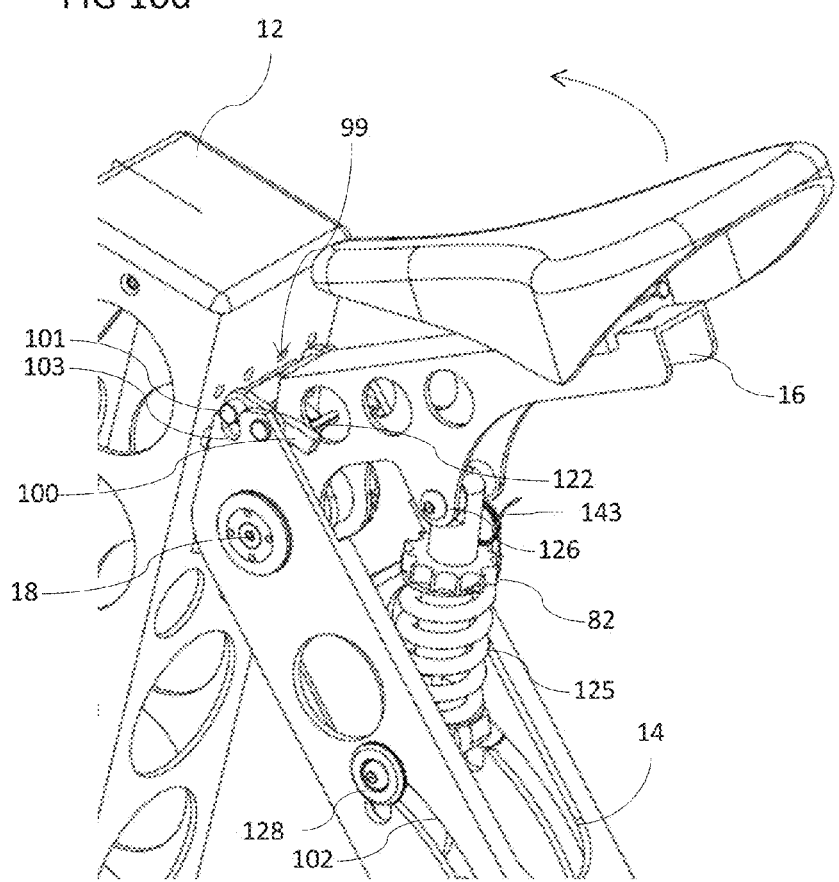
Figure 10E:
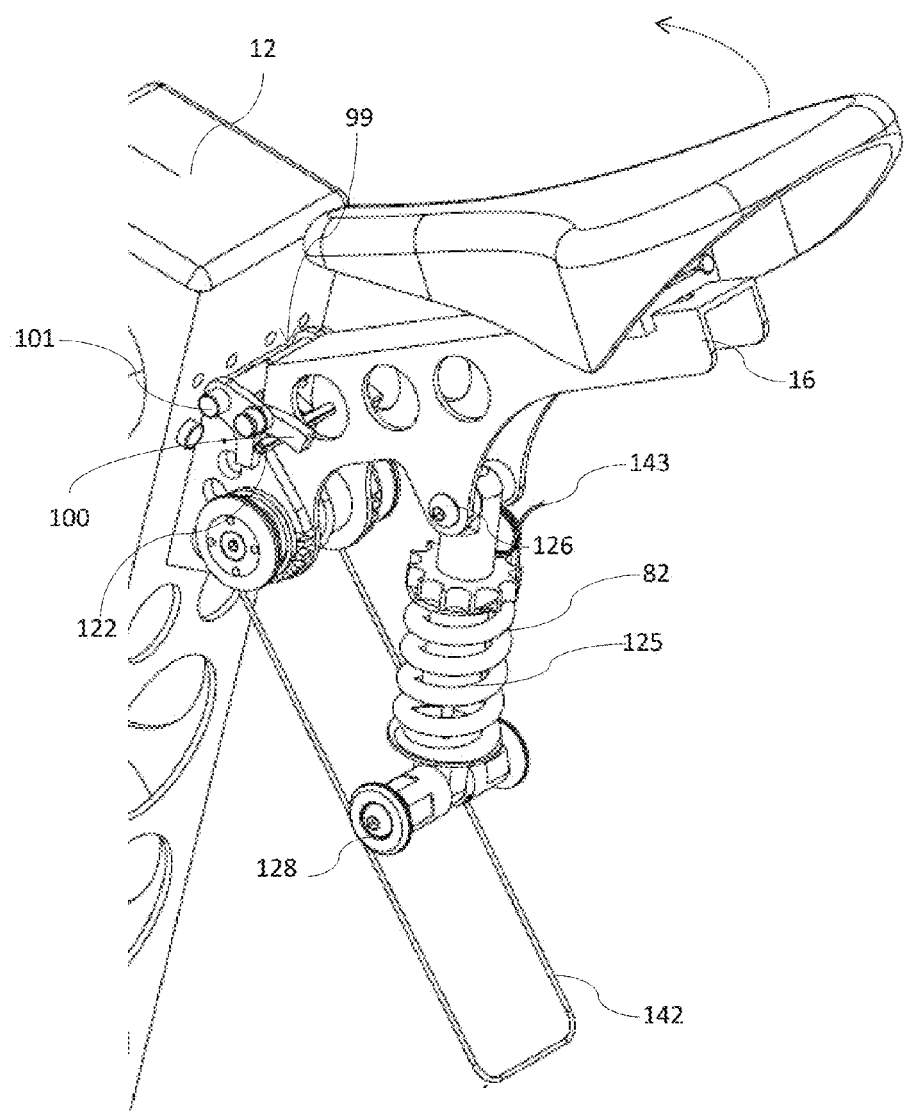

During operation of some embodiments, the locking mechanism (99) is disengaged from both the open/riding position and the closed/compacted position by pulling up on the seat-bearing post (16), as shown in FIGS. 10c to 10e. In some such embodiments, the locking mechanism (99) includes a pin and groove mechanism, wherein the seat lock disengagement pin (122) of the seat-bearing arm (16) engages the arm (100) on the rear locking mechanism to lift the rear locking pin (101) out of engagement with the locking grooves (64 and 103, not shown) on the front and rear arms to allow the arms to move between the locking positions. In addition, in some embodiments the sliding interconnection (128) on the seat-bearing support (82) is lifted free of notch (108) on the locking groove (102) to allow the sliding interconnection to slide along groove (102). In addition, in some embodiments a resilient spring (142) may be provided to apply a resilient guiding force to the sliding interconnection (128) of the seat-bearing arm support within the groove (102) and notches (106 and 108), thereby assisting in directing it along the groove during operation, thereby advancing the movement and operation of the folding mechanism of the vehicle.

Figure 10F:
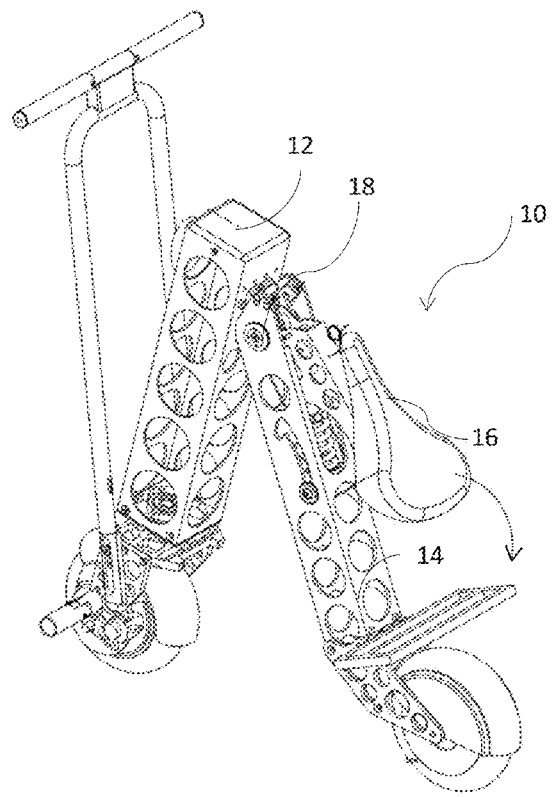
Figure 10G:
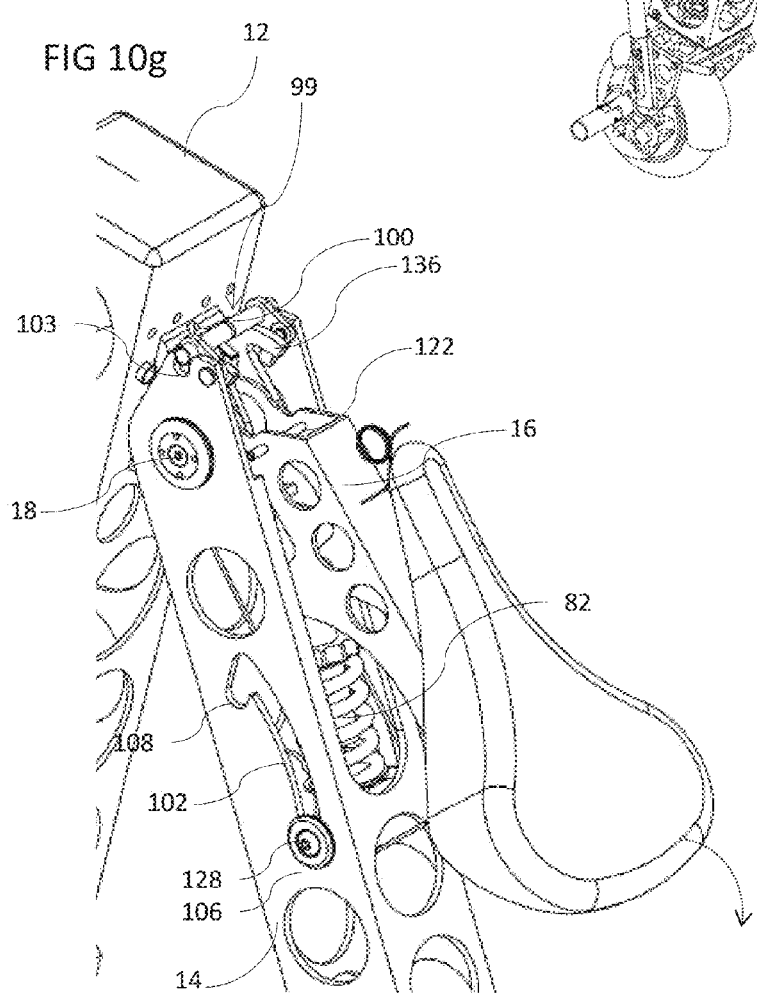
Figure 10H:
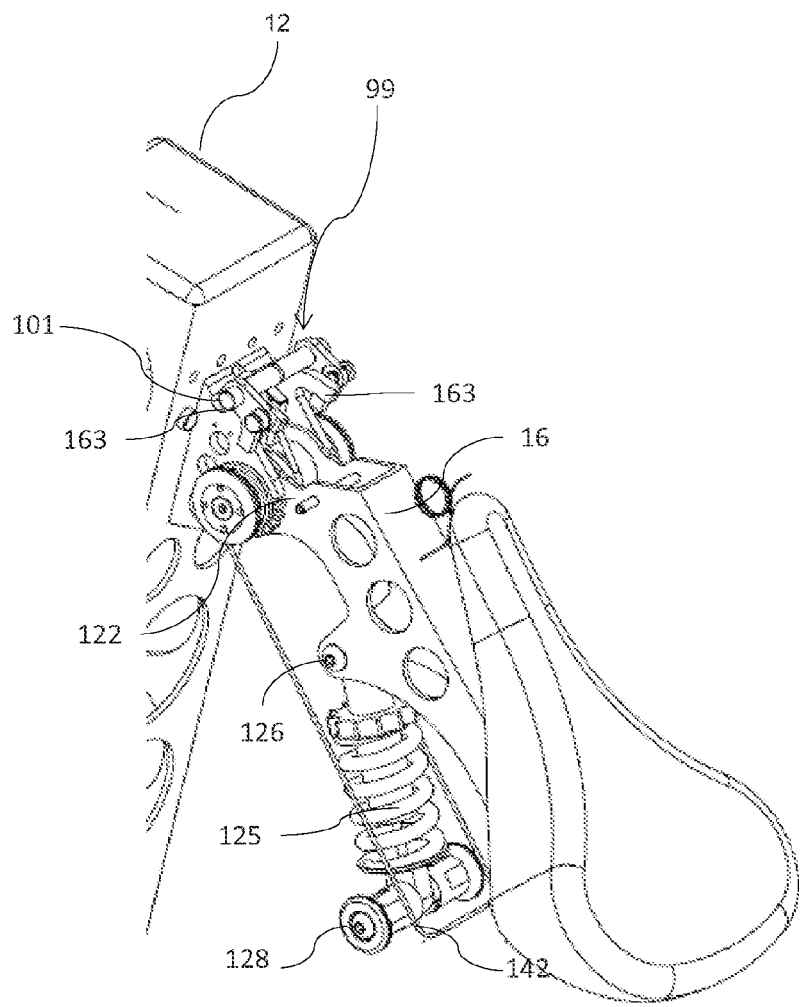

As shown in FIGS. 10f to 10h, once the locking mechanism (99) and the seat-bearing support (82) are disengaged by raising the seat up, the arms may be pivoted from the open configuration to the closed configuration. In some embodiments, as the arms (12, 14 and 16) pivot downward (as indicated by the arrow) the locking pin (101) slides along the top edge (136) of the front pivot hinge bracket (62). Likewise, in many embodiments, the resilient supporting member (82) slides within locking channel or slot (102) formed into the rear wheel-bearing arm (14), said channel or slot delineating a path between closed and open positions of the mechanism.

Figure 10I:
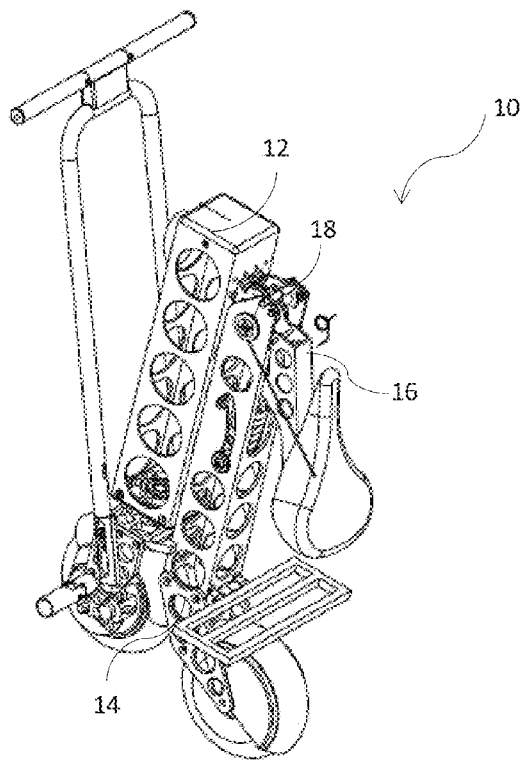
Figure 10J:
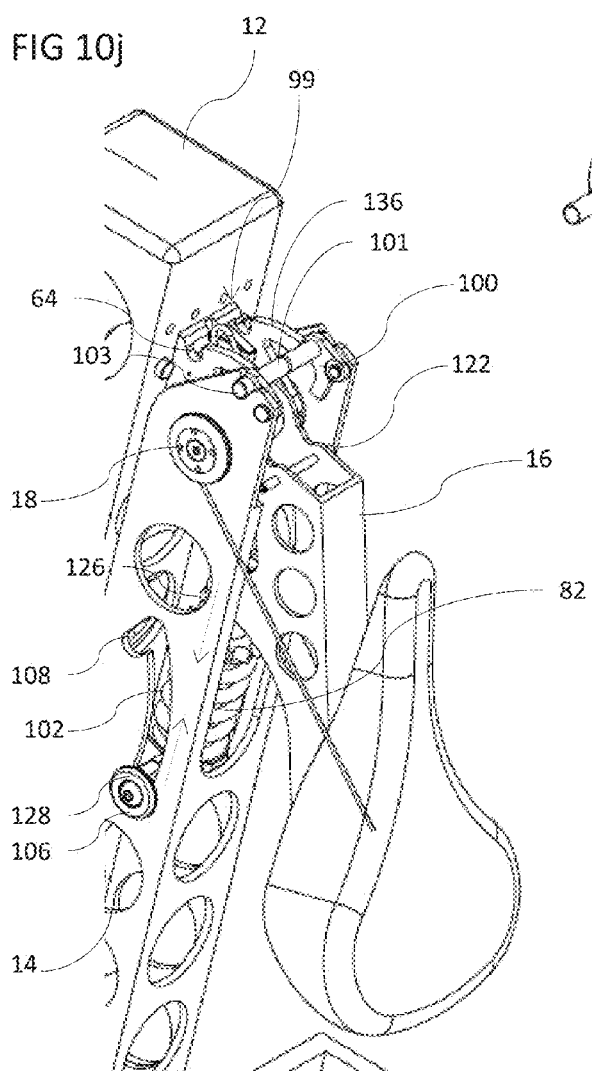
Figure 10K:
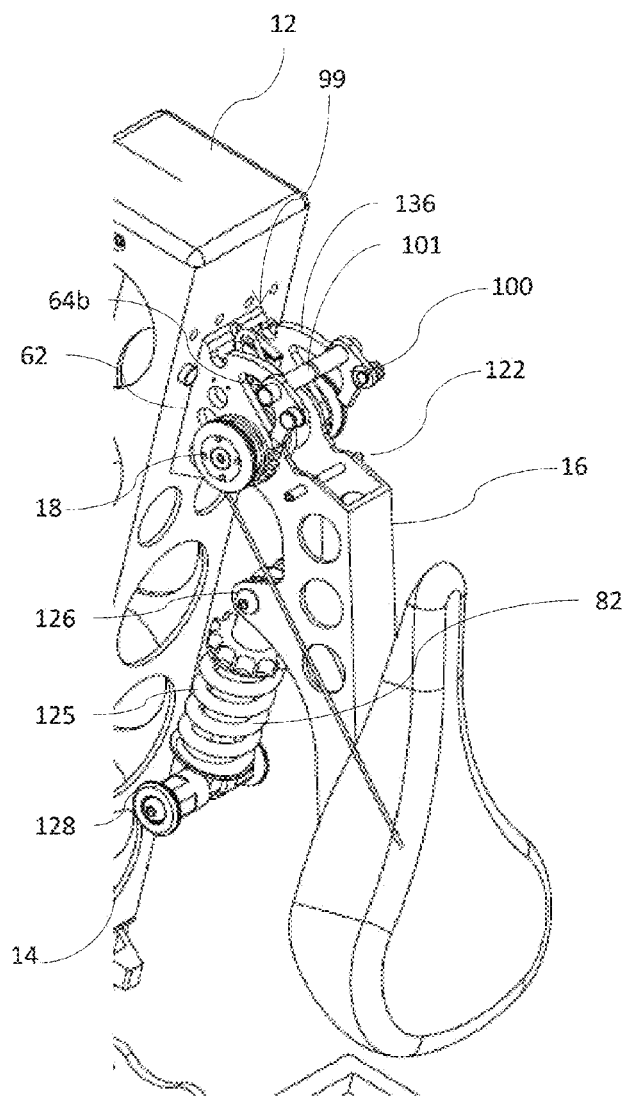

As shown in FIGS. 10i to 10k, once the arms reach their terminus in the closed/compact configuration wherein the arms are adjacent in a roughly parallel alignment, the locking mechanism (99) reengages to lock the wheel-bearing arms into the closed configuration. In particular, as shown in the figures, in many embodiments the seat locking pin (122) disengages the arm (100) allowing the rear locking pin (101) to engage the second locking groove (64b) on the front pivot hinge bracket (62), as shown in FIG. 10k. The pin (101) also reengages the rear locking groove (103) on the rear wheel-bearing arm (14) thereby locking the front and rear wheel-bearing arms in the closed configuration where the axes of the arms are roughly parallel such that a compact form is obtained. The seat-bearing arm support element (82), may also be configured such that when said seat-bearing arm (16) is pivoted into the locking position (106) along the locking groove (102), the resilient member (125) is placed into tension (as shown by arrows in FIG. 9d) such that a resilient locking force is applied to lock the seat-bearing arm into position against the adjacent wheel-bearing arm. In addition, in some embodiments a resilient spring (143) may be provided in association with the pivoting interconnection (126) to apply a resilient guiding force to the pivoting interconnection of the seat-bearing arm support (82) thereby assisting in locking the seat-bearing arm support into a closed position within the body of the rear wheel-bearing arm (14) and, in turn, the seat-bearing arm into a closed position against the adjacent rear wheel-bearing arm (14) during a folding operation.

It should be understood that although the illustrated embodiments show specific configurations of locking mechanisms, including particular geometries, dispositions and configurations of pins, channels, grooves, notches, etc. that these elements could be modified substantially while maintaining the functionality of the vehicle folding mechanism such that a single cooperative pivot point and locking mechanism is provided capable of being engaged and operated to simultaneously fold the arms of the vehicle from an open/riding position such that the seat is extended outward away from the structural arm, and a second/closed position at which the seat is locked into a compact position where the seat is folded against or flush with the second structural arm, via the manipulation of one of the arms of the vehicle, such as, for example, the seat-bearing arm.

Figure 11A:
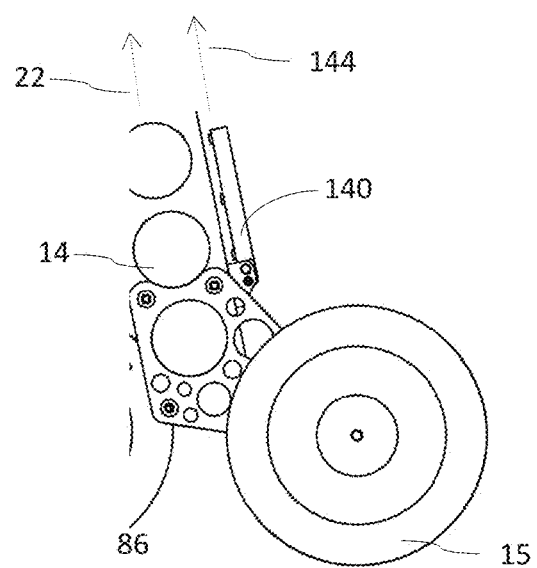
FIGS. 11a and 11b show side views of a foldable electric vehicle and the rear foldable luggage rack in a compact folded configuration (11a), and an open riding configuration (11b) in accordance with embodiments of the invention.
Figure 11B:
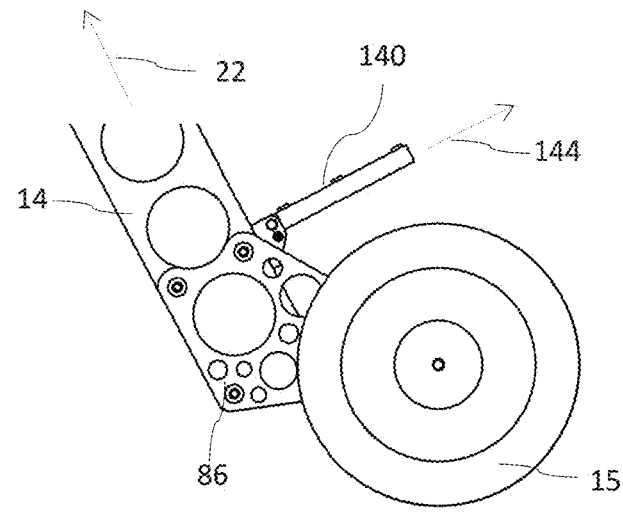

An optional element that may be provided on the vehicle (10) is a luggage rack (140). In many embodiments, the luggage rack comprises an elongated platform that may be disposed in any suitable location on the vehicle. In some embodiments, as shown in FIGS. 11a and 11b, the luggage rack (140) may be disposed along the length of the rear wheel-bearing arm (in many embodiments at the lower end (86) of the arm (14). Such a rack, in many embodiments may also be configured such that it is repositionable between open and compact configurations. In some embodiments the luggage rack may be pivotable between a closed position (shown in FIG. 11a) where the luggage rack is folded against the rear wheel-bearing arm, and an open position (shown in FIG. 11b) where the luggage rack forms a platform suitable for the support of objects placed thereon, such an action may be mechanically coupled to the folding of the arms or may be independently actuated. In some such embodiments, the position of the luggage rack (140) relative to the rear wheel-bearing arm (14) may be defined by the axis (144) of the luggage rack. In one such embodiment, in the open position (FIG. 11b) the axis (144) of the luggage rack forms an angle relative to the axis (22) of the rear wheel-bearing arm, while in the closed position (FIG. 11a) the axis of the luggage rack is substantially parallel to the axis of the rear wheel-bearing arm. It should be understood that, although the luggage rack (140) is disposed on the rear wheel-bearing arm (14) of the vehicle, it may be positioned anywhere along the vehicle such a suitable object supporting platform may be formed.

In still other embodiments, as shown in FIG. 12, the vehicle (10) may include other electrical components including lights (146) and interconnections (147) for accessories (148), such as, for example, mobile handsets or other personal electronics. The electronics interconnection (147) may be disposed anywhere on the vehicle suitable for use. In some embodiments the electronics interconnection is placed in signal communication with at least one sensor configured to deliver information on at least one vehicle parameter and deliver information from the at least one sensor to the personal electronic device. In some such embodiments the at least one vehicle parameter is selected from the group consisting of vehicle speed, energy consumption, energy reserve, mileage, and direction.

Figure 13A:
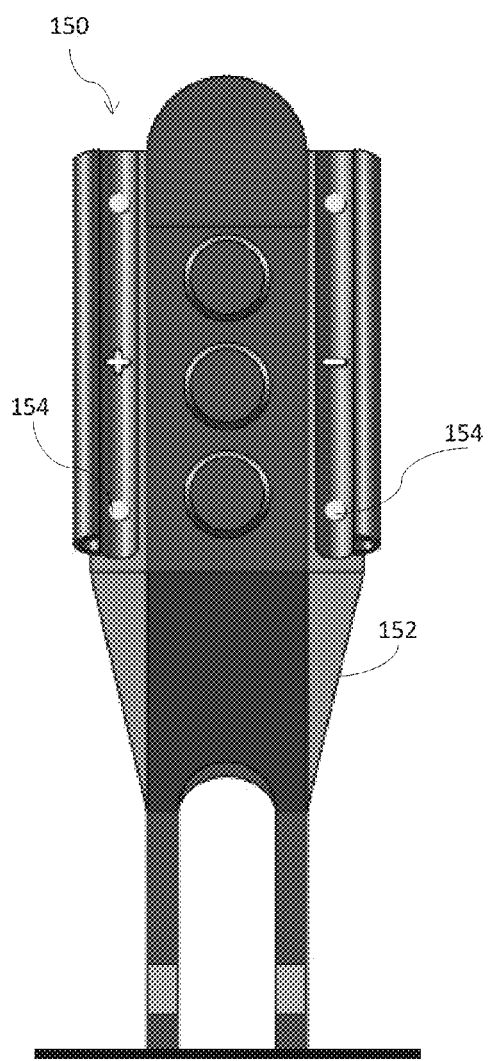
FIGS. 13a and 13b provide schematic views of an exemplary charging station for use in association with an exemplary foldable electric vehicle in accordance with embodiments of the invention.
Figure 13B:
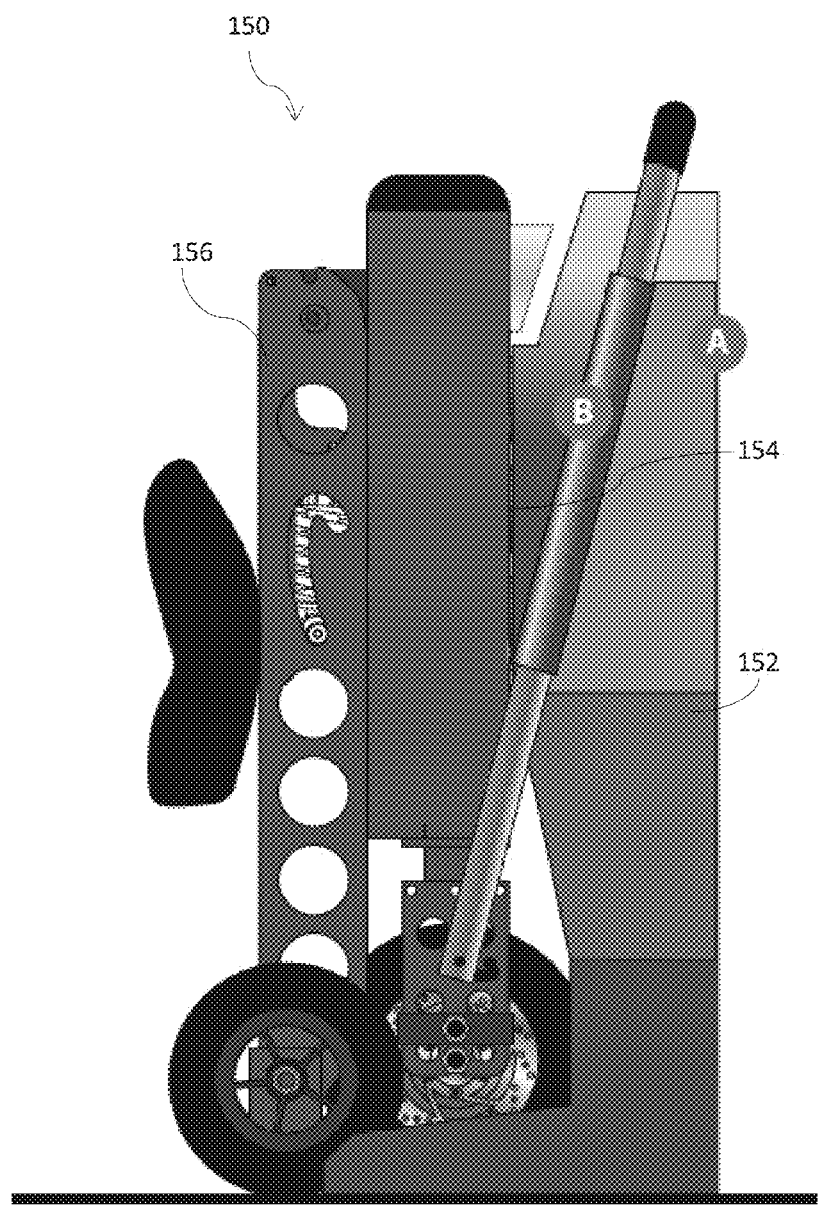

In embodiments, the disclosure is also directed to a charging station configured to electrically interconnect to the vehicle such that electrical power can be introduced to the power source via one or more electrical connectors disposed on a portion of the external structure of the vehicle. In some embodiments, the electrical connectors are disposed on the front structural arm of the vehicle and the charging station is configured to engage the vehicle in a closed/compact configuration. In other embodiments, the charging station further includes vehicle securing assemblies for securely attaching and locking the vehicle into a charging position where the electrical connectors on the charging station and vehicle are electrically interconnected. An exemplary charging station (150) for use with a foldable electric vehicle is also shown in FIGS. 13a and 13b, in many embodiments the charging station generally comprises a framework (152) having one or more charging contacts (154) that are configured to electrically interconnect with a foldable electric vehicle (156) to provide a power recharging source. Although one configuration of a charging station is shown in the figures, it will be understood that the location, number size and configuration of the charging contacts and vehicle interconnection may be altered to suit the specific design of the vehicle. In addition, although a single unit is described, in embodiments multiple charging stations can be provided and interconnected through a single central kiosk for controlling the stations, payments and control charging/availability.

DOCTRINE OF EQUIVALENTS

As can be inferred from the above discussion, the abovementioned concepts can be implemented in a variety of arrangements in accordance with embodiments of the invention. For example, though the foldable vehicle has been described in relation to an electric vehicle, it will be understood that the construction and folding mechanism described could be adapted for use with other propulsion types, including, for example, a gasoline powered internal combustion engine. Likewise, although the vehicle has been described in relation to two wheel-bearing arms, it will be understood that any number of arms could be used along with the proposed vehicle folding mechanism.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A foldable vehicle comprising:
    at least two wheel-bearing arms each having first and second ends and each defining a wheel-bearing arm longitudinal axis, each of said wheel-bearing arms having at least one wheel assembly interconnected to the second end thereof and a wheel-bearing arm pivot hinge bracket disposed along the length thereof;
    at least one seat-bearing arm having first and second ends and defining a seat-bearing arm longitudinal axis, the seat-bearing arm having a seating platform interconnected to the second end thereof and a seat-bearing pivot hinge bracket disposed along the length thereof;
    a seat support element pivotably engaged at a first end thereof along the length of the seat-bearing arm and slidingly engaged at a second end thereof along the length of one of the at least two wheel-bearing arms such that a triangular configuration is formed between the seat-bearing arm, the at least one wheel-bearing arm and the seat support element; and
    wherein the at least two wheel-bearing arm pivot hinge brackets and the seat-bearing pivot hinge bracket are configured to cooperatively interconnect to form a vehicle pivot hinge such that the wheel-bearing arms and seat-bearing arm are pivotably interconnected about a single vehicle pivot point to move between at least two configurations:
    a first riding configuration wherein the longitudinal axes of the at least two wheel-bearing arms and the seat-bearing arm have a first angular offset relative to each other, and
    a second folded configuration wherein the longitudinal axes of the two wheel-bearing arms and the seat-bearing arm have a second angular offset relative to each other wherein the second angular offset is smaller than the first angular offset.

2. The foldable vehicle of claim 1, further comprising a steering mechanism interconnected with at least one of said wheel-bearing arms and configured to change the directional orientation of at least one wheel assembly relative to the vehicle.

3. The foldable vehicle of claim 2, wherein the vehicle comprises a front wheel-bearing arm and a rear wheel-bearing arm, and wherein the steering mechanism is pivotably interconnected with the wheel assembly of the front wheel-bearing arm to move between at least two configurations:
    a first riding configuration wherein the longitudinal axes of the front wheel-bearing arm and the steering mechanism have angular offsets relative to each other, and a second folded configuration wherein the longitudinal axes of the front wheel-bearing arm and the steering mechanism are parallel.

4. The foldable vehicle of claim 3, further comprising a front wheel assembly lock configured to prevent changes to the directional orientation of the wheel assembly of the front wheel-bearing arm when in the folded configuration.

5. The foldable vehicle of claim 3, wherein the front wheel-bearing arm defines an internal volume having an energy storage device disposed therein.

6. The foldable vehicle of claim 2, wherein the steering mechanism is at least one handlebar, and wherein the height and angle of the handlebar relative to height of the remainder of the vehicle is adjustable.

7. The foldable vehicle of claim 1, wherein each of the at least two wheel-bearing arm pivot hinge brackets and the seat-bearing arm pivot hinge bracket are disposed proximal to the first end of their respective arms.

8. The foldable vehicle of claim 1, further comprising a pivot locking mechanism configured to disengageably lock the at least two wheel-bearing arms in one of the at least two configurations.

9. The foldable vehicle of claim 8, wherein the pivot locking mechanism comprises a plurality of locking grooves and a cooperative locking pin configured to engage said locking grooves, said locking grooves being disposed on at least one of the at least two wheel-bearing arms, and said cooperative locking pin being disposed on at least another of the at least two wheel-bearing arms such that when the cooperative locking pin is engaged within the locking grooves the at least two wheel-bearing arms are prevented from pivoting relative to each other.

10. The foldable vehicle of claim 9, further comprising a locking mechanism disengagement element disposed on the seat-bearing arm and configured to disengage the pivot locking mechanism when the seat-bearing arm is pivoted upward relative to the axial alignment of the seat-bearing arm in one of either the first riding configuration or the second folded configuration.

11. The foldable vehicle of claim 1, wherein the axis of the seat support element is orthogonal with the axis of the seat-bearing arm.

12. The foldable vehicle of claim 1, wherein the seat support element slidingly engages a channel disposed along a portion of the wheel-bearing arm, the channel delineating a curvilinear path between at least two configurations:
   a first riding configuration wherein the longitudinal axes of the wheel-bearing arm and the seat-bearing arm and the seat support element have a first angular offset relative to each other, and
   a second folded configuration wherein the longitudinal axes of the wheel-bearing arm and the seat-bearing arm and the seat support element have a second angular offset relative to each other wherein the second angular offset is smaller than the first angular offset.

13. The foldable vehicle of claim 12, wherein the seat support element comprises a resilient member.

14. The foldable vehicle of claim 13, wherein the seat support element is configured such that when the seat-bearing arm is pivoted into the second folded configuration the resilient member is placed into tension such that a resilient locking force is applied to the seat-bearing arm to urge said seat-bearing arm into position in the second folded configuration.

15. The foldable vehicle of claim 12, further comprising at least one additional resilient element disposed in relation to said seat support element to apply a force thereto, thereby urging said seat support element into at least one of either the first riding configuration or the second folded configuration.

16. The foldable vehicle of claim 1, wherein the vehicle comprises two wheel-bearing arms, a front wheel-bearing element having a front wheel assembly with a single wheel, and a rear wheel-bearing element having a rear wheel assembly with at least one wheel.

17. The foldable vehicle of claim 16, wherein the rear wheel assembly comprises at least two wheels interconnected via a fixed axle.

18. The foldable vehicle of claim 16, wherein the rear wheel assembly comprises at least two wheels interconnected via an axle pivotable about a point perpendicular to the axis of the rear wheel-bearing armature.

19. The foldable vehicle of claim 1, further comprising at least one luggage rack disposed on at least one of the wheel-bearing arms, said luggage rack being pivotable between at least two configurations:
   a first riding configuration wherein the longitudinal axes of the wheel-bearing arm and the luggage rack have angular offsets relative to each other, and
   a second folded configuration wherein the longitudinal axes of the wheel-bearing arm and the luggage rack are parallel.

20. The foldable vehicle of claim 1, further comprising at least one electric motor disposed within at least one of the wheel assemblies and an energy storage device interconnected therewith.

21. The foldable vehicle of claim 1, further comprising an electronics interconnection disposed thereon, the electronics interconnection configured to deliver information on at least one vehicle parameter to a personal electronic device.

22. The foldable vehicle of claim 21, wherein the at least one vehicle parameter is selected from the group consisting of vehicle speed, energy consumption, energy reserve, mileage, and direction.

* * * * *